(12) United States Patent
Gaunt et al.

(10) Patent No.: US 6,543,740 B2
(45) Date of Patent: Apr. 8, 2003

(54) MECHANISM FOR TRANSMITTING MOVEMENT IN UP TO SIX DEGREES-OF-FREEDOM

(75) Inventors: Robert Gaunt, Victoria (CA); Scott Roberts, Victoria (CA); Andre Anthony, Victoria (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/944,136

(22) Filed: Sep. 4, 2001

(65) Prior Publication Data

US 2003/0047660 A1 Mar. 13, 2003

(51) Int. Cl.[7] .................................................. B60R 1/02
(52) U.S. Cl. ........................................ 248/476; 248/479
(58) Field of Search ................................ 248/476, 478, 248/479, 483, 466, 474, 276.1

(56) References Cited

U.S. PATENT DOCUMENTS

| | | | | |
|---|---|---|---|---|
| 4,132,318 A | * | 1/1979 | Wang et al. ............... 294/86.4 |
| 4,684,088 A | * | 8/1987 | Heller ....................... 248/123.2 |
| 5,193,963 A | * | 3/1993 | McAffee et al. ................ 414/5 |
| 5,263,382 A | | 11/1993 | Brooks et al. ................. 74/471 |
| 5,301,566 A | | 4/1994 | Tahmasebi et al. ............ 74/479 |
| 5,333,514 A | | 8/1994 | Toyama et al. ................ 74/479 |
| 5,484,219 A | * | 1/1996 | Drew et al. ..................... 403/24 |
| 5,656,905 A | | 8/1997 | Tsai ....................... 318/568.21 |
| 5,794,541 A | * | 8/1998 | Hirose .......................... 108/20 |
| 5,901,936 A | | 5/1999 | Bieg .......................... 248/370 |
| 6,047,610 A | | 4/2000 | Stocco et al. ............. 74/479.01 |
| 6,179,262 B1 | * | 1/2001 | Ellard et al. .............. 248/276.1 |
| 6,402,329 B1 | * | 6/2002 | Bailly et al. ................ 248/476 |
| 2002/0015624 A1 | * | 2/2002 | Wang et al. ................ 409/201 |

* cited by examiner

Primary Examiner—Ramon O. Ramirez
Assistant Examiner—A. Joseph Wujciak, III
(74) Attorney, Agent, or Firm—Marks & Clerk

(57) ABSTRACT

Disclosed is a positioner for transmitting movement in up to six degrees-of-freedom to an object on the positioner, the positioner comprising a base plate, a first plate mounted on the base plate by a first mechanical linkage, a first actuator arrangement for moving the first plate, a second plate mounted on the first plate by a second mechanical linkage, a second actuator arrangement for moving the second plate, and a holder attached to the second plate for mounting the object. One of the first and second plates is movable in a plane in up to three degrees-of-freedom, and the other of the first and second plates is movable in up to three degrees-of-freedom that are out of the plane. It is also possible to add an additional plate, including an actuator arrangement for moving the additional plate, mounted by a mechanical linkage between the second plate and the holder.

30 Claims, 22 Drawing Sheets

MECHANISM FOR TRANSMITTING MOVEMENT IN UP TO SIX DEGREES-OF-FREEDOM

FIELD OF THE INVENTION

This invention relates to a mechanism for positioning objects, particularly mirrors, in up to six degrees-of-freedom, namely X-, Y- and Z-translation and rotation about X-, Y- and Z-axes.

BACKGROUND OF THE INVENTION

Known six degrees-of-freedom mechanisms are varied in structure and operation, resulting in different levels of orientational freedom (work volume), positional repeatability, stiffness and coupling. Coupling is related to the extent to which isolation of motion in one of the degrees-of-freedom is possible.

U.S. Pat. No. 5,028,180 discloses a six degrees-of-freedom motion mechanism that is similar to a Stewart Platform in operation, but is intended for machine tools. Six legs, adjustable in length, connect a platform to a base and can be adjusted to set the platform at a desired orientation.

U.S. Pat. No. 5,263,382 discloses a mechanism that provides six degrees-of-freedom with only three fixed-length legs attached to the movable platform. The legs are in two sections with a one degree-of-freedom hinge joint at their connection point. Each leg is driven by a pair of motors, by way of a differential drive system. The pitch and yaw of each leg is controlled. By controlling the two degrees-of-freedom of each of the three legs, six degrees-of-freedom motion of the moveable platform is accomplished. This mechanism is complex, particularly the differential drive system.

U.S. Pat. No. 5,301,566 discloses a hybrid manipulator. Three fixed length limbs are attached to a platform via universal joints. By changing the location of the lower end of each of the three limbs using two degrees-of-freedom parallel drivers, the platform can be positioned in six degrees-of-freedom.

U.S. Pat. No. 5,333,514 discloses a six degrees-of-freedom parallel manipulator. This manipulator is fully parallel but instead of using linear actuators for the links as in a traditional Stewart Platform, the six arms are in two sections. The first section is mounted to a rotary actuator. By rotating these six base links, the position of the platform can be controlled in six degrees-of-freedom.

U.S. Pat. No. 5,656,905 discloses a hybrid manipulator for machine tools. Two parallel mechanisms are described in which each is a three degrees-of-freedom mechanism. These two mechanisms can be combined in serial fashion to form a hybrid mechanism or they can be combined in parallel to form a cooperating mechanism. One mechanism is dedicated to translational motion while the other is dedicated to rotational motion.

U.S. Pat. No. 5,901,936 discloses a fully parallel six degrees-of-freedom motion mechanism. This mechanism is similar to a Stewart Platform. Disclosed is the use of rotary actuators in place of linear actuators for the legs of the manipulator. There are two main embodiments disclosed. In the first embodiment, there are two fixed length links joined by a hinge at their attachment point. The lower link attaches to the base and the upper link attaches to the moving platform. The hinge joint at the connection of the two links is actuated. Combining six copies of this mechanism allows motion in six degrees-of-freedom. In the second embodiment, a universal driver is used at the base. One axis of the universal joint is actuated while the other is passive. The link then attaches to the moving platform.

U.S. Pat. No. 6,047,610 discloses a hybrid six degrees-of-freedom manipulator. The disclosed device uses two five-bar linkages mounted so that the plane in which they act can rotate. These five-bars are attached to a platform. Coupling the two five-bars together provides five degrees-of-freedom motion. A final motor near the platform provides the last degree-of-freedom. The two serial five-bar linkages, together in parallel arrangement, form the hybrid manipulator.

SUMMARY OF THE INVENTION

The mechanisms in the above known devices are fundamentally different from the mechanism providing motion in six degrees-of-freedom in the apparatus of the present invention.

In one aspect, the present invention provides a positioner for transmitting movement in up to six degrees-of-freedom to an object on the positioner, the positioner comprising a base plate, a first plate mounted on the base plate by a first mechanical linkage, a first actuator arrangement for moving the first plate, a second plate mounted on the first plate by a second mechanical linkage, a second actuator arrangement for moving the second plate, and a holder attached to the second plate for mounting the object. One of the first and second plates is movable in a plane in up to three degrees-of-freedom, and the other of the first and second plates is movable in up to three degrees-of-freedom that are out of the plane.

An additional plate, including an actuator arrangement for moving the additional plate, can be mounted by a mechanical linkage between the second plate and the holder and, by this approach, the three degrees-of-freedom systems can be stacked to provide redundantly actuated mechanisms depending on the needs of a given situation. The additional plate can be movable in a plane in up to three degrees-of-freedom if it is desired to provide planar motion, decoupled from non-planar motion, directly to the object in the holder. It is also possible to provide this decoupled motion by arranging the two plates mentioned above with the second plate being movable in a plane in up to three degrees-of-freedom, and the first plate being movable in up to three degrees-of-freedom that are out of the plane in which the second plate can be moved. Such arrangements are suitable when decoupled planar motion of the object is required.

In a preferred embodiment, the first plate is movable in a plane in up to three degrees-of-freedom, and the second plate is movable in up to three degrees-of-freedom that are out of the plane in which the first plate can be moved.

Conveniently, the positioner further includes a first bias for biasing the first plate (also referred to herein as "stage one") against the first actuator arrangement, and a second bias for biasing the second plate (also referred to herein as "stage two") against the second actuator arrangement. Preferably, the first bias comprises a set of springs (also referred to herein as "actuator preload springs") anchored to the base plate and to the first plate. More preferably, the first bias comprises a first set of springs anchored to the base plate and to the first plate, for biasing the first edge of the first plate against the first actuator, and a second set of springs anchored to the base plate and to the first plate, for biasing the second edge of the first plate against the second and third actuators. Preferably, the second bias comprises a third set of springs anchored to the second plate and to the first plate.

It is also possible to use magnetic-based biasing as the first and/or second bias.

The first actuator arrangement for moving the first plate is suitably a first plurality of actuators mounted on the base plate. Preferably, the first plurality of actuators comprises a first, a second and a third actuator (also referred to herein as "X-, Y1- and Y2-actuators", respectively), the first actuator conveniently contacting a first edge of the first plate and the second and third actuators contacting a second edge of the first plate. The first and second edges of the first plate are preferably at substantially right angles to each other (orthogonal). Conveniently, the first, second and third actuators each comprise a micrometer. Motorized micrometers or piezo actuators could also be used.

The second actuator arrangement is suitably a second plurality of actuators mounted on the first plate. Preferably, the second plurality of actuators comprises a fourth, a fifth and a sixth actuator (also referred to herein as "Z1-, Z2- and Z3-actuators"). More preferably, the fourth, fifth and sixth actuators are spaced apart and extend substantially orthogonally from the first plate and contact a surface of the second plate. Conveniently, the fourth, fifth and sixth actuators each comprise a micrometer assembly that includes a contact pin for contacting the second plate. Motorized micrometers or piezo actuators could also be used.

Conveniently, the first lockable mechanical linkage comprises a plurality of bolts and a corresponding plurality of nuts, preferably three nut and bolt combinations, wherein the bolts are spaced apart and extend through corresponding clearance holes in the base plate and holes in the first plate. A cam lock system could be used in place of a bolt.

The second lockable mechanical linkage suitably comprises three rods, each housed in its own passage in the first plate perpendicular to, and intersecting with, the contact pins (also referred to herein as "Z-pins") of the fourth, fifth and sixth actuators, respectively. Each rod (also referred to herein as "Z-pin lock shaft") has an indent that partially surrounds a respective contact pin. In addition, each rod has a threaded portion having a nut for tightening to produce frictional engagement of the rod with its respective contact pin. A cam lock system can also be used to produce the frictional engagement.

The holder conveniently comprises a third plate (also referred to herein as "transition plate") substantially parallel to the second plate and connected thereto by a third mechanical linkage, and fourth mechanical linkage for connecting the object to the third plate. The holder may alternatively consist of a regular array of threaded holes in the second plate to allow for custom mounting solutions for varying objects.

The third mechanical linkage suitably comprises a plurality of tooling balls, preferably three, each tooling ball being on a corresponding arm that extends from the third plate. The arms are spaced apart and the balls are sized to pass through corresponding holes in a lock plate into corresponding vee grooves in the second plate. Each hole in the lock plate includes an elongated slot sized to receive a corresponding arm when the lock plate is rotated to a locking position after the tooling balls have been passed through the corresponding holes in the lock plate to lock the third plate to the second plate.

If the object is a mirror, the fourth mechanical linkage conveniently comprises a plurality of flexures, preferably three, secured to the object in a spaced apart configuration, each flexure including an arm extending from the object and terminating in a locking portion that is substantially orthogonal to the arm. The locking portion is sized to pass through a corresponding hole in the third plate, and each corresponding hole in the third plate includes a slot sized to receive an arm when the object is rotated to a locking position after the locking portions have been passed through the corresponding holes in the third plate. Preferably, the locking portion is bolted to the third plate when each arm is in its corresponding slot.

The mechanism of the present invention is a hybrid design that provides motion in six degrees-of-freedom by arranging two, distinct, three degrees-of-freedom mechanisms in series. Additional copies of the three degrees-of-freedom parallel mechanisms can be added in series to increase the degree of control of positioning by the system. The division of the degrees-of-freedom allows the mechanism to be split into two parts, each of which is highly symmetric and has a very low profile. Combining the two, three degrees-of-freedom mechanisms together results in a positioner that is very small and is easily adjustable.

While known parallel mechanisms generally have low work volumes, high mechanical stiffness and complex forward kinematic solutions, the present invention allows high mechanical stiffness to be retained while providing simple kinematics. The positioner of the present invention is useful for positioning mirrors, particularly off-axis conic mirrors, which generally do not require a large work volume.

Preferably, the object on the positioner is a mirror, such as an off-axis conic mirror. Other objects requiring precision positioning and orientation, including lasers etc., are also suitable.

The kinematic solution for the positioner of the present invention can be easily found once the forward and inverse solutions for each of the three degrees-of-freedom parallel mechanisms are known. Closed form solutions for each of the three degrees-of-freedom parallel mechanisms exist and are determinable.

All of the moving components that determine the position of the object are perfectly constrained kinematically. In other words, each moving component is supported at six points in such a way that these six contacts exactly determine the position of the component in space. For a given position of the six contacts, there is exactly one possible position of the component. This makes adjustments extremely repeatable. If the position of each contact is known exactly, then the position of the components will be known exactly.

The motions in six degrees-of-freedom are separated into two distinct mechanisms. Each of these mechanisms has a low height compared to its width and the footprint of the mechanism is similar in size to the object which is being positioned. However, the overall height of the mechanism is approximately just three times that of the object, if the object is a mirror. Compared to commercially available solutions for providing motion in six degrees-of-freedom, this is very small. This small size is important, as many situations require the overall volume of adjustment mechanisms to be minimized.

In applications that require very high accuracy, high stiffness is almost always a requirement. As mentioned earlier, parallel mechanisms tend to be very stiff as the payload is supported at a number of points. Combining a number of single degree-of-freedom mechanisms together to form a six degrees-of-freedom mechanism results in a device with low stiffness in comparison to the present invention. This high stiffness allows the mechanism to be moved under changing conditions such as a gravity vector while maintaining the position of the object very accurately.

Once adjustment of the object is complete, its position can be locked which significantly increases its stiffness.

Once the final position of the object is reached in the present invention, the mechanism can be locked to prevent accidental adjustment. While this is not necessary, this is of particular benefit to applications where a one-time alignment will be followed by an operational time of days, weeks or years. The mechanism that is used to lock the adjustments in place is separate from the adjustment mechanisms themselves. This has at least three benefits. Accidental adjustment of the device is near impossible since the locking mechanism will mechanically prevent the actuators from moving the mechanism. The actuators themselves can be removed from the device once the final position is reached. This can allow more accurate and generally more expensive actuators to be used without requiring them to be dedicated to the device. They could be removed from the device after adjustment and used elsewhere, as they are not required to hold the final position of the mechanism. Finally, since the locking mechanism is external to the adjustment mechanism, it can be designed to provide extra stiffness.

The present invention also allows for the repeatable removal and replacement of the object without requiring re-adjustment of the mechanism. It is possible that once the object is positioned correctly there will never be a desire to re-adjust it. However, there is often a requirement to remove the object from the positioner for servicing or upgrading. The present invention allows the object to be removed from the positioner, then serviced and replaced on the device in exactly the same position from which it was removed. This operation is accomplished using a kinematic clamp.

The hybrid nature of the mechanism of the present invention allows for simple workspace optimization for any task. The first three degrees-of-freedom parallel mechanism is responsible for planar translation and rotation (in a Right Hand Coordinate system X translation, Y translation and rotation about the Z-axis). The second, three degrees-of-freedom mechanism is responsible for the remaining two rotations and translation along the Z-axis. It is conceivable that there are problems in which large X and Y translations but little rotation about these axes will be required. Optimizing the design to accomplish this is very simple and has no effect on the accuracy or resolution of the system.

The present invention is also scalable, and can be applied to positioning objects of many sizes. A typical use is for mounting mirrors 100 mm in diameter to 300 mm in diameter. The design, with appropriate considerations made regarding scaling, could be used for mirrors a few centimeters in diameter, or smaller, to meters in diameter. The dimensions of the plates can be adjusted in length, breadth and/or height as required and ultimately the plates may take on any suitable shape that may or may not be plate-like.

The actuators in the present invention are conveniently located in two closely spaced parallel planes. Preferably, three actuators control Z translation, as well as X and Y rotation, and are all located in a plane parallel to the surface of the first plate. Preferably, three actuators control X and Y translation, as well as Z rotation, and are located in another parallel plane between the base and first plate. This arrangement allows for easy access to the actuators from the back of the device. In a preferred embodiment, the X, Y1 and Y2 actuators are stationary, and the Z1, Z2 and Z3 actuators move with the position dictated by these first three actuators.

The six degrees-of-freedom in this device are partially decoupled to allow simple and comprehensible adjustment. To perform accurate adjustments of the object in an arbitrary coordinate system, a computer program can be used to calculate necessary actuator adjustments for a particular final position, as all six degrees-of-freedom become coupled. In other words, the design is amenable to implementation in an automatic control system. By implementing sensors to measure the position of the object and motorizing the actuator arrangements, a closed loop control system can be produced. The algorithms for the software control of the six degrees-of-freedom positioner can be implemented in this control system.

As well as using a computer to calculate the adjustments necessary to position the device, a computer can be used to automate the positioning itself, through communication with motorized actuator arrangements.

The preferred layout of the actuators does allow for decoupled motions in some cases. Also, it is probable that, at some point during an alignment or adjustment procedure, motions may be required based on trial and error. A typical Stewart Platform, or a variation thereof, precludes this type of adjustment as there is no simple way of knowing which actuator motion, or combination of actuator motions, will accomplish the desired action. The present invention is designed in such a way that trial and error adjustments are easily possible, as moving a particular actuator will have the expected effect within some relatively small error margin.

BRIEF DESCRIPTION OF THE DRAWINGS

Further features and advantages will be evident from the following detailed description of the preferred embodiments of the present invention, taken in conjunction with the accompanying drawings in which.

DETAILED DESCRIPTION OF THE PREFERRED EMBODIMENTS

Figure 1:
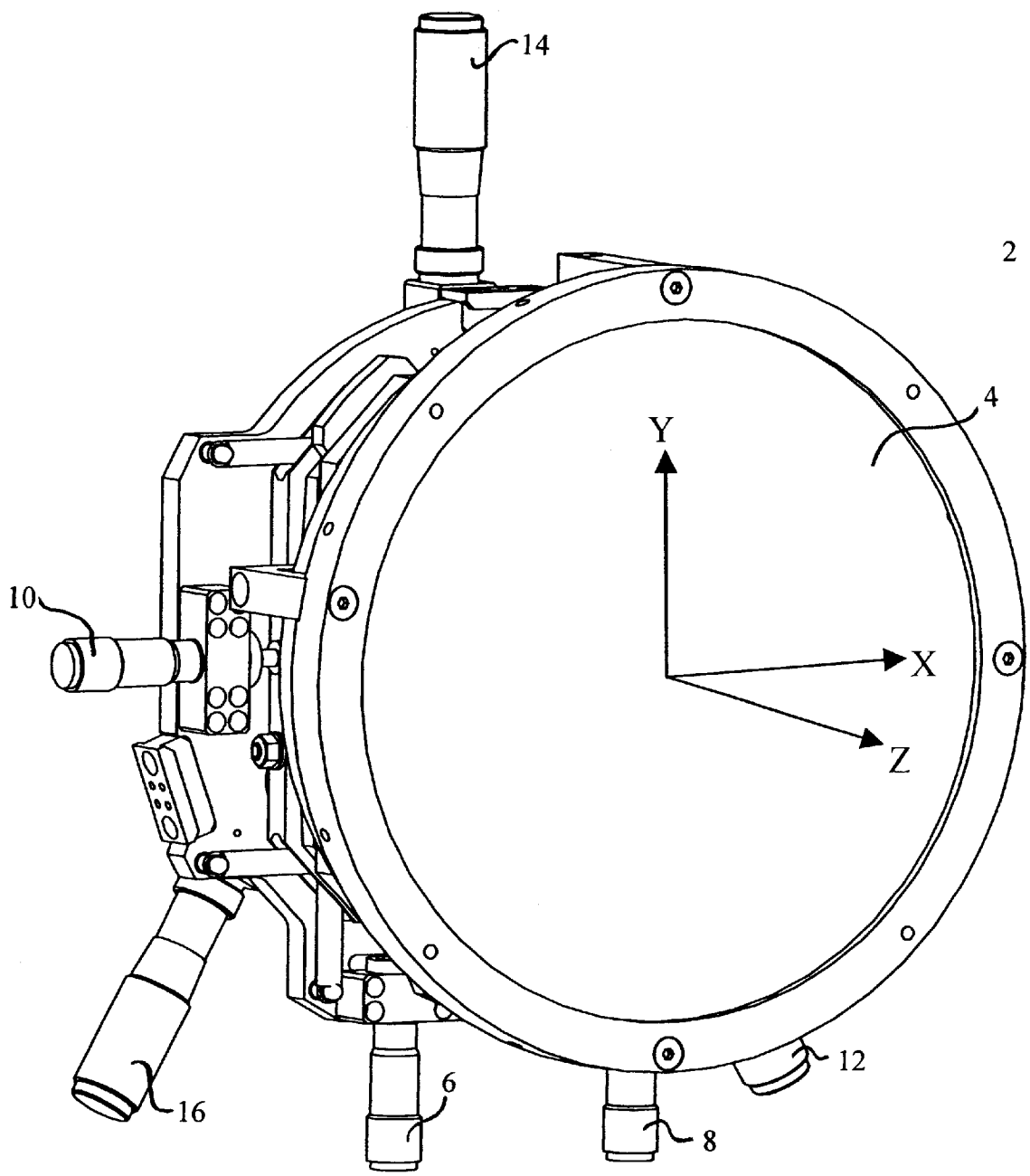
FIG. 1 is a perspective view of an embodiment of a six degrees-of-freedom positioner in which the object to be positioned is a mirror, and shows the coordinate system used to identify the motions imparted by the actuators.

A coordinate system is used in the following discussions of an embodiment of a six degrees-of-freedom positioner. This coordinate system places the XY plane in the plane of the first plate with the Z-axis pointing towards the second plate. The three orthogonal axes simply provide a reference direction for each of the degrees of freedom (FIG. 1).

There are six micrometers used in the positioner 2 to achieve the required six degrees-of-freedom motion of the mirror 4. The actuators are named according to the motion that they produce in the defined coordinate system (FIG. 1).

The two actuators 6 and 8, located at the lower most portion of the positioner, are known as actuators Y1 and Y2, respectively. These micrometers produce linear motion in the Y-axis as well as rotations about the Z-axis. The actuator in the −X direction is Y1 and the actuator in the +X direction is Y2.

The actuator that produces linear motion in the X direction is known as the X actuator 10. The X, Y1 and Y2 actuators become coupled for an arbitrary position of the object.

The three remaining actuators 12, 14 and 16 are known collectively as the Z-Pin actuators (or actuator assemblies). The actuators are defined as Z1, Z2 and Z3, respectively. The position of each of these actuators is shown in FIG. 1. These actuators produce linear motion in the Z direction as well as rotations about the X- and Y-axes.

Two distinct positioner embodiments are discussed herein both of which are used to position mirrors. The designs are similar but they handle the mounting of different sized mirrors. The "large positioner" is the first embodiment of the positioner 20, as found for example in FIGS. 2 and 3. The "small positioner" is the second embodiment of the positioner 22, as found for example in FIGS. 2 and 4. The large positioner 20 handles mirrors around 300 mm in diameter with masses of up to 10 kg while the small positioner 22 handles mirrors around 150 mm in diameter with masses up to 2 kg.

Figure 2:
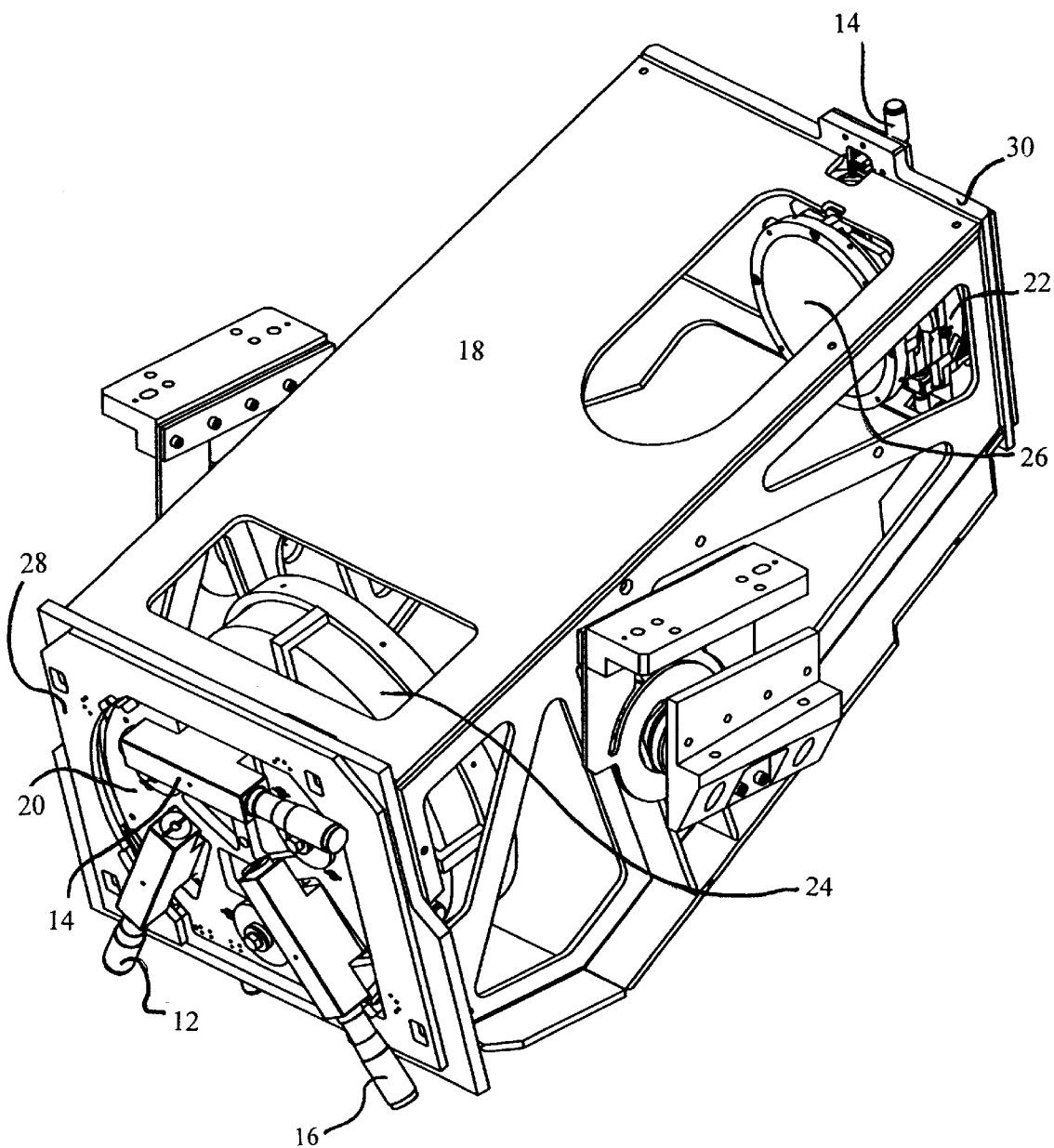
FIG. 2 is a perspective view of a structure having two mirrors mounted on two different embodiments of the six degrees-of-freedom positioner of the invention.

There are two interfaces between the six degrees-of-freedom positioners and the surrounding components. These interfaces are strictly mechanical and the first is between a support structure 18 and the first embodiment of a six degrees-of-freedom positioner 20 having a mirror 24, or the second embodiment of a positioner 22 having a mirror 26 (FIG. 2). The second interface is between a six degrees-of-freedom positioner and the object that it supports.

Figure 3:
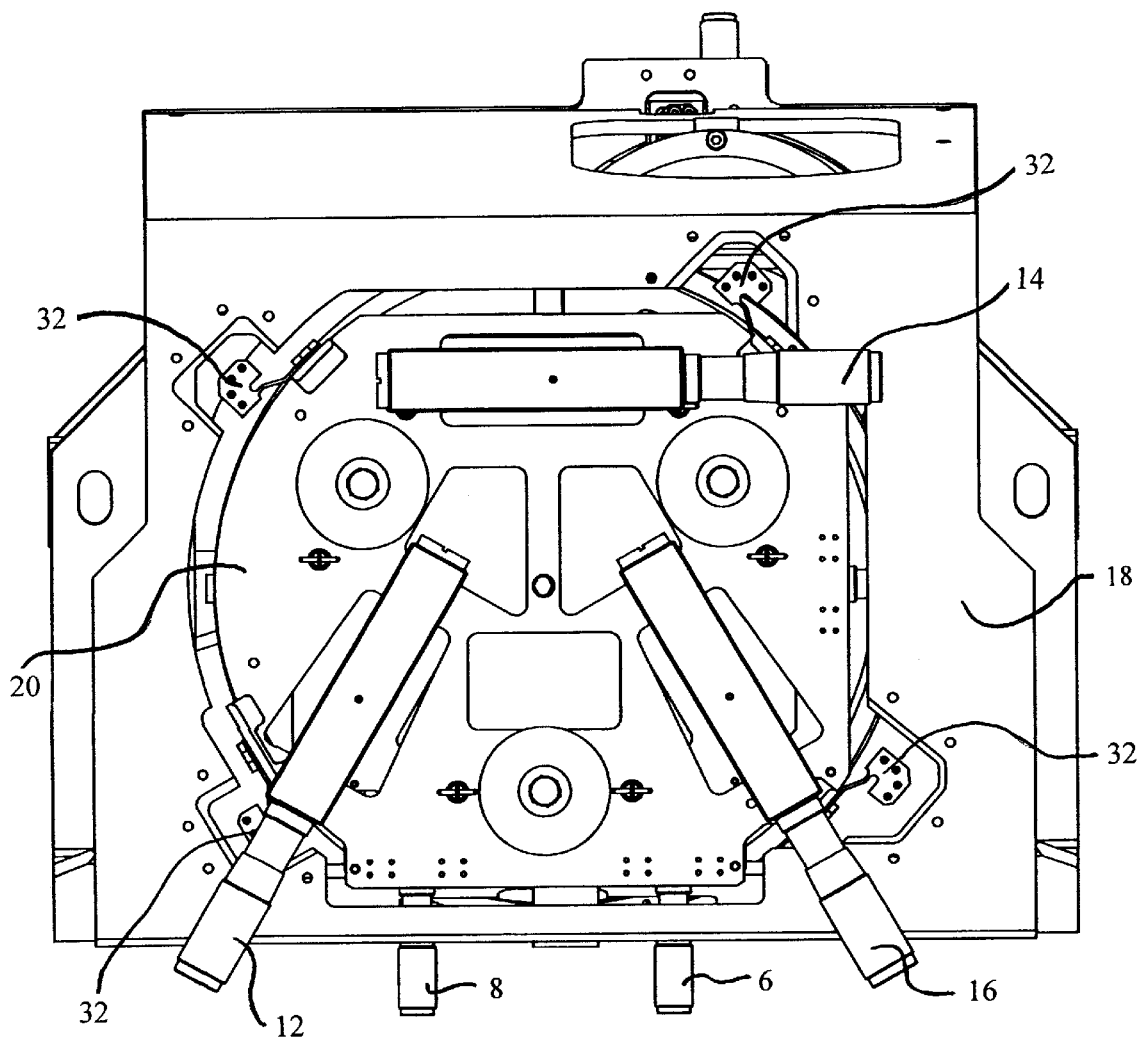
FIG. 3 is an end view of the first embodiment of the positioner, as seen in FIG. 2, showing the mechanical linkage used to secure the six degrees-of-freedom positioner to a stand, particularly if the positioner and stand are manufactured from different materials.
Figure 4:
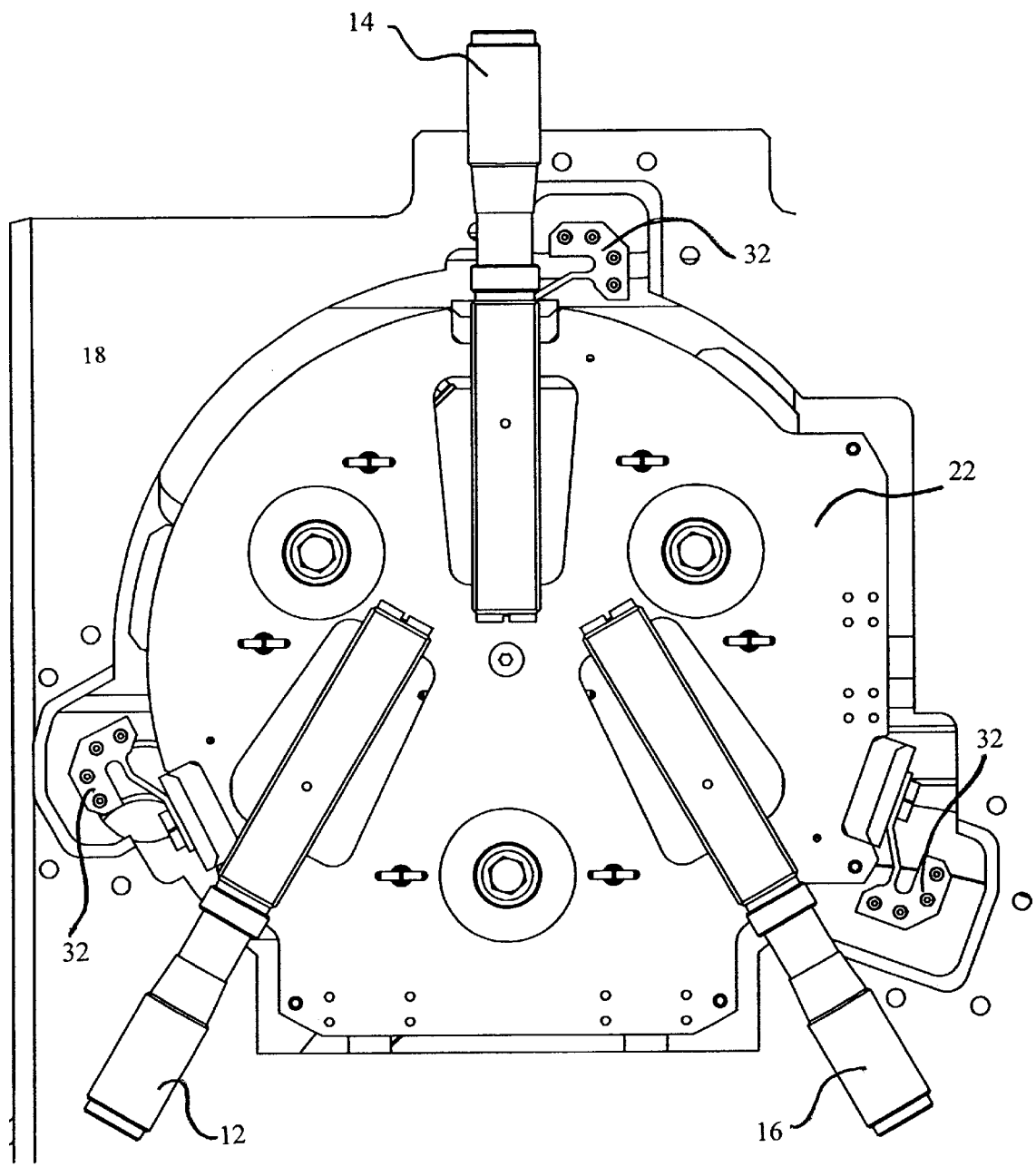
FIG. 4 is an end view of the second embodiment of a positioner, as seen in FIG. 2, showing the mechanical linkage used to secure the six degrees-of-freedom positioner to a stand particularly if the positioner and stand are manufactured from different materials.

The first and second embodiments are attached to the support structure 18 by means of four and three tangential flexures 32 made from the same material as the support structure (Invar 36™ in this case), or other suitable material (FIG. 3 and FIG. 4 respectively). These flexures 32 allow the positioners, which in general are made from a different material (in this case 416 stainless steel) to expand and contract relative to the support structure 18. The flexures 32 are not directly bolted to the support structure 18. The flexures are attached to an interface flexure plate 28 and 30, that allows gross adjustment of the positioner relative to the support structure 18. This plate is then bolted to the support structure 18. The flexures 32 are then bolted to the six degrees-of-freedom positioner.

Each of the mirrors 24 and 26 is attached to its six degrees-of-freedom positioner by three blade flexures 34 attached to the back face of the mirror. These flexures allow the six degrees-of-freedom positioners to expand and contract relative to the mirror 4 without inducing stress in the glass and thus deforming the mirror surface.

Figure 5:
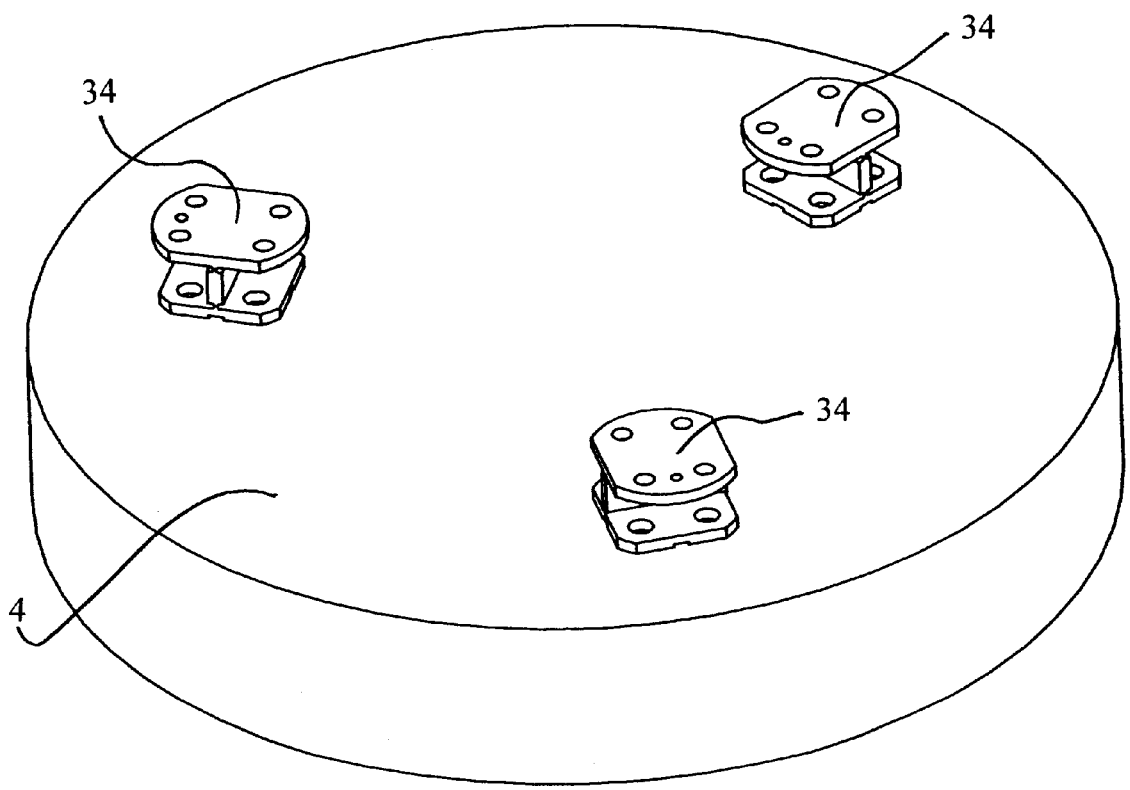
FIG. 5 is an isometric view of the rear of a mirror, showing mirror flexures used for attaching the mirror to a transition plate.

The flexures are spaced 120 degrees apart and are located at 0.645 times the radius of the applicable mirror. This minimizes the root mean square deformation of the mirror surface. The blades of the flexures 34 are parallel to a tangent line drawn at the diameter of the mirror (FIG. 5).

The flexures 34 are manufactured from a material (Invar 36 in this case) to closely match the coefficient of thermal expansion of the mirrors (Zerodur™ in this case).

Each flexure 34 is attached to the transition plate 46 using a screw connection. The flexures 34 are in turn attached to the mirror 4 using an adhesive. If the mirror is to be re-coated, an adhesive such as Master Bond™ EP21TCHT-1 is used as it is a low outgassing adhesive and has been successfully used in environments of $10^{-9}$ torr. Also, no organic material is outgassed that could compromise the quality of the mirror coating.

Figure 6:
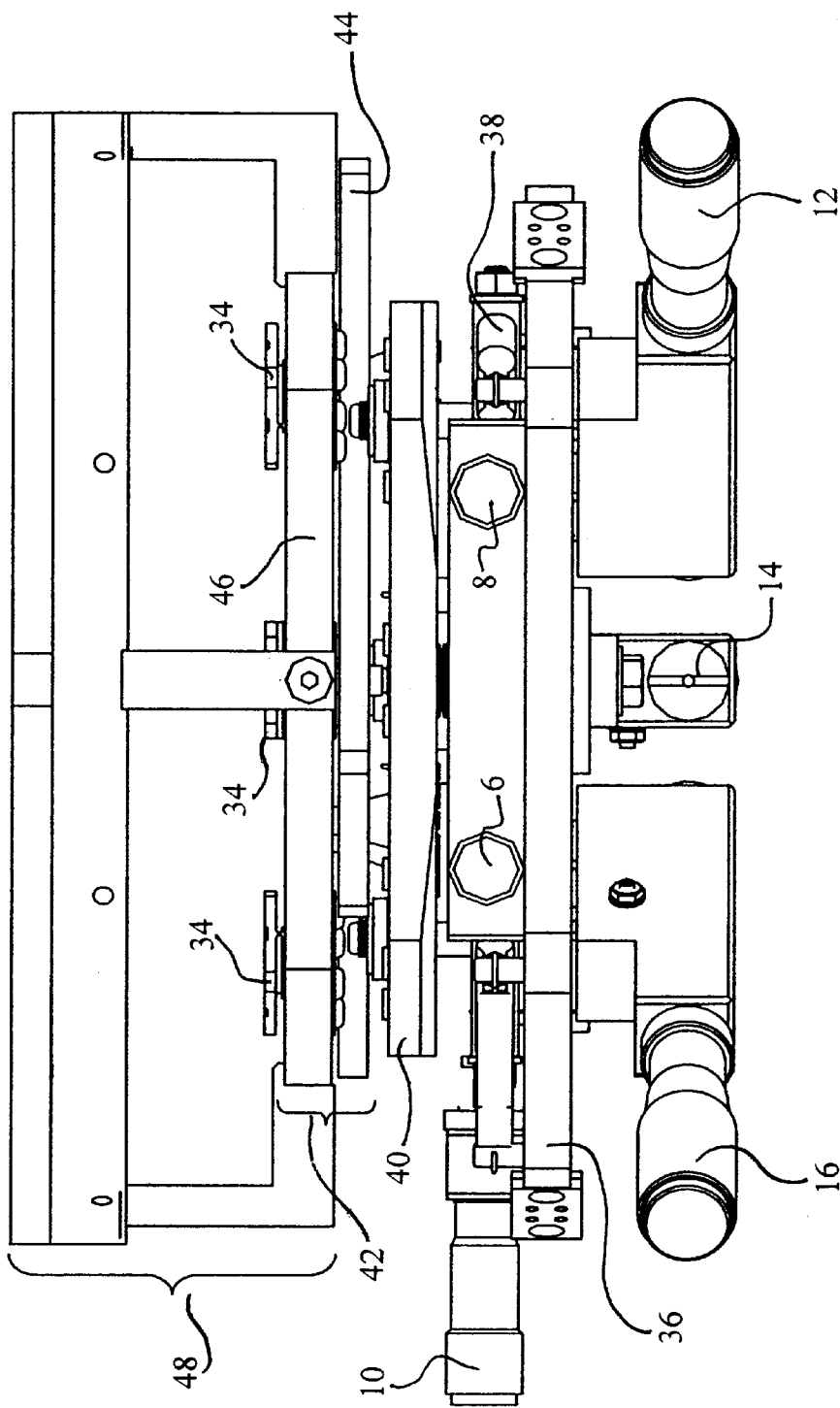
FIG. 6 is a side view of the positioner of FIG. 4.
Figure 7:
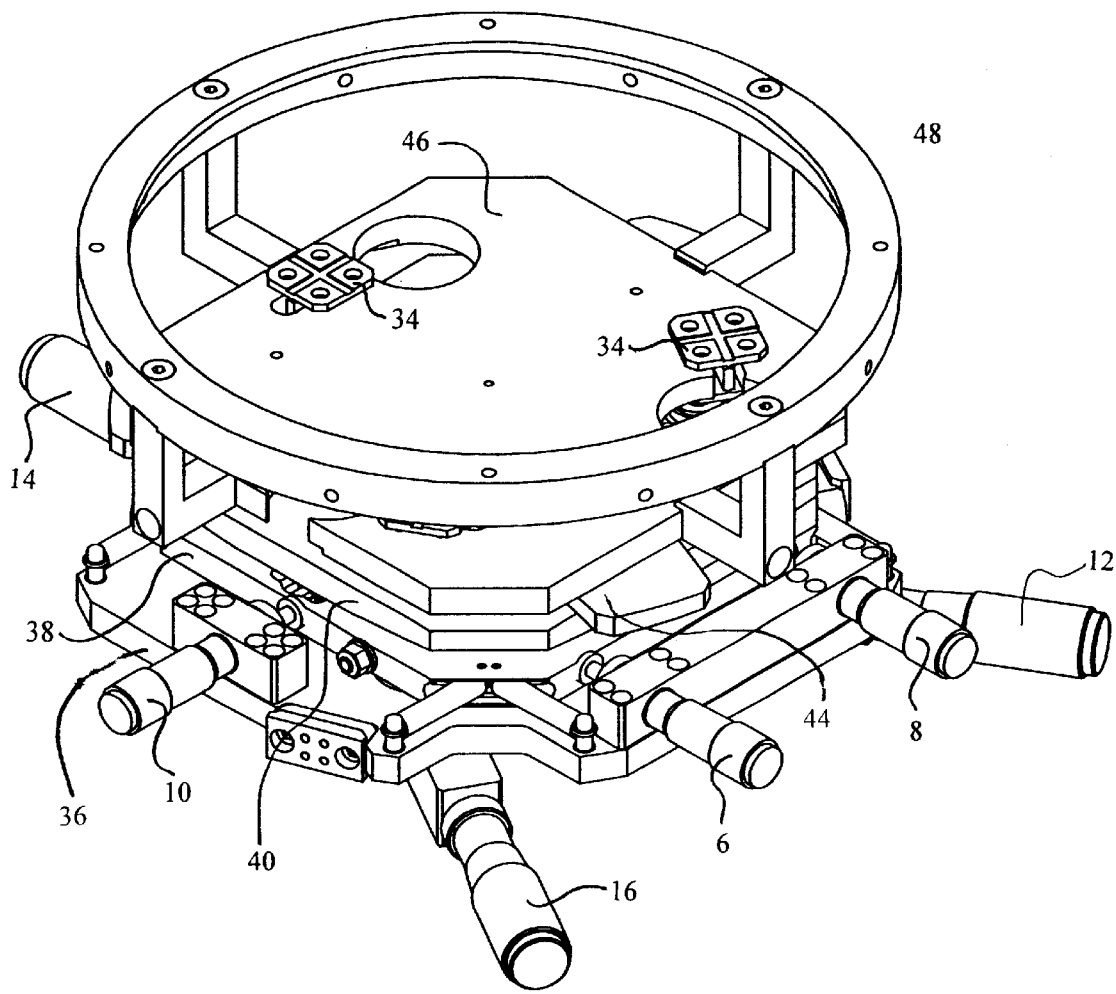
FIG. 7 is an isometric view of the positioner of FIG. 4 with the mirror removed.

The six degrees-of-freedom positioner 2 design is separated into four different functional components. Each of these components fulfils a distinct requirement of the positioner. FIG. 6 and FIG. 7 show each part of the positioner and its location relative to the other components. The aforementioned components are:

Base Plate 36—The base plate 36 is the foundation of the positioner. The base plate 36 attaches the entire positioner 2 to the system, such as the support structure 18. The base plate 36 holds the Y1, Y2 and X actuators 6, 8 and 10 in place. Additionally, the base plate 36 has a number of other minor functions.

Stage One 38—Stage one 38 is located on the base plate 36 by means of three raised pads which provide a semi-kinematic contact surface. Stage one 38 allows the object to be translated along the X and Y axes, as well as rotated about the Z-axis. The Y1, Y2 and X actuators 6, 8 and 10 allow these three motions to be achieved. These three degrees-of-freedom are partially decoupled from the three remaining degrees-of-freedom.

Stage Two 40—The second stage of the positioner allows the object to be rotated about the X and Y axes and translated along the Z-axis. Stage two is kinematically mounted to Z-pins which are a part of the Z1, Z2 and Z3 actuators 12, 14 and 16, and provides a kinematic clamping base for the mirror lock mechanism 42.

Z-Pin Actuator Assemblies 12, 14 and 16—These three actuator assemblies contain a ramp to change the translation of the actuators in the X-Y plane to a motion in the Z direction. These assemblies house the three Z-pins. This configuration keeps all six actuators parallel to a common plane but allows stage two 40 to be adjusted in the correct orientations. Note that these assemblies move with stage one to partially decouple the three degrees-of-freedom that these assemblies provide from the previous three degrees-of-freedom.

Mirror Lock 42—This system is made up of two plates that allow the mirror to be removed and replaced in the same position with extremely high repeatability. The lock plate 44 allows the system to be locked and unlocked, while the transition plate 46 clamps kinematically to stage two 40 and houses flexures 34 that attach to the mirror.

Mirror Safety Capture 48—The mirror safety capture 48 ensures that a mirror 4 will not be damaged if a positioner component fails. This system is divided into two sections. The first section acts between the six degrees-of-freedom positioner 2 and the support structure 18. The second section ensures that the mirror 4 itself can not become separated from the six degrees-of-freedom positioner 2 if the flexures 34 or bonding agent fails. This second sections also includes a removable cover (not shown) to protect the mirror 4 during its removal and installation.

All of the major components of the six degrees-of-freedom positioners 2 are manufactured from the same material to minimize stress induced deformations from temperature changes (416 stainless steel in this case).

Base Plate

The outline of the base plate 36 is approximately circular with radii of 150 mm and 75 mm for the first 24 and second 26 embodiments of the positioners, respectively. These sizes correspond to the size of the mirrors for the first 24 and second 26 embodiments. The base plate 36 is 12 mm and 8 mm thick for the first 24 and second 26 embodiments of the positioners, respectively. Both plates have 1 mm thick raised pads 50 that act as semi-kinematic mounting points.

Figure 8:
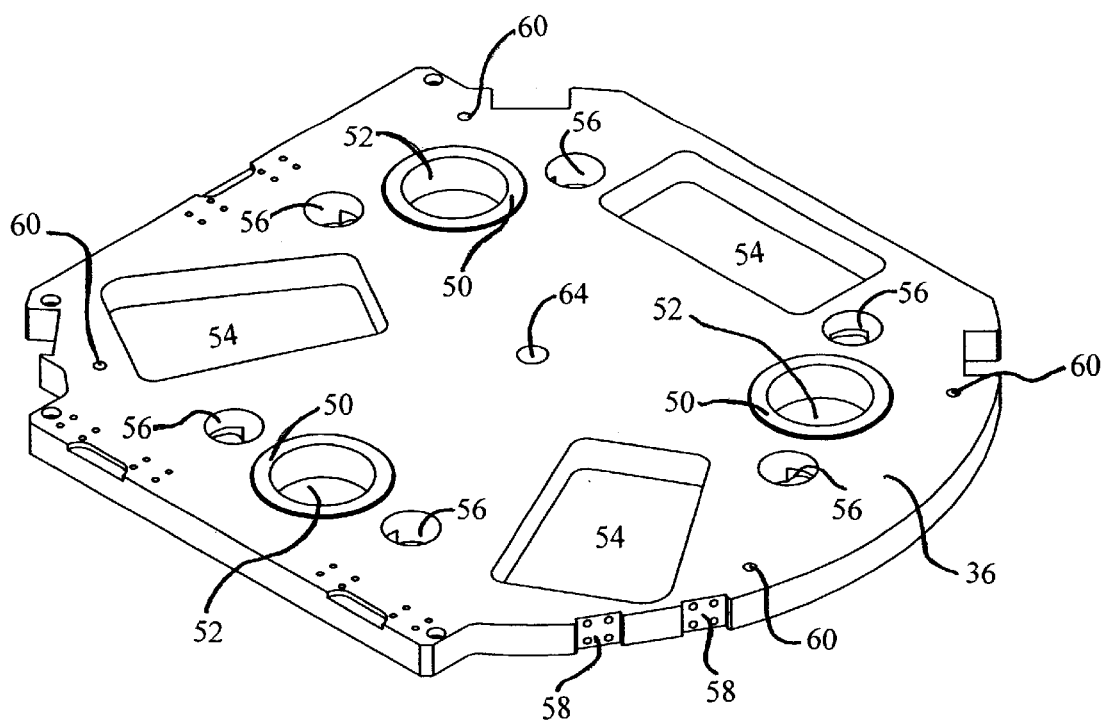
FIG. 8 is an isometric top view of the base plate of the positioner of FIG. 3.
Figure 9:
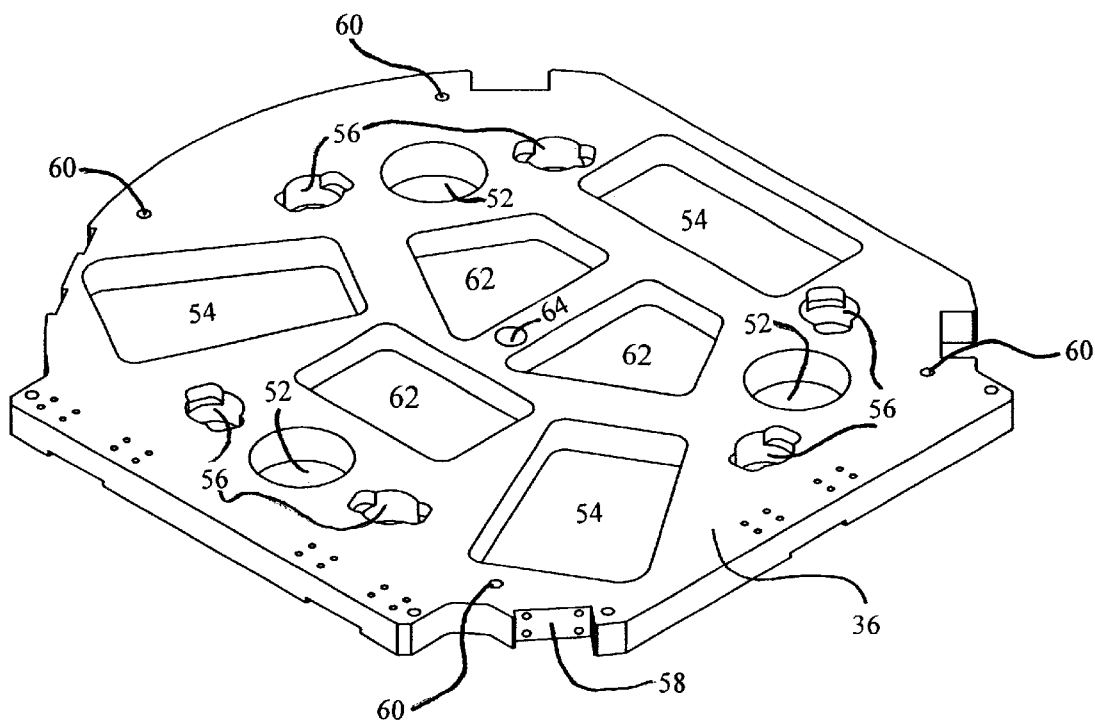
FIG. 9 is an isometric bottom view of the base plate of the positioner of FIG. 3.

The base plate 36 incorporates eight main features that allow the positioner to have the required functionality. The base plate 36 and its features are shown in FIG. 8 and FIG. 9. These main features are:

Semi-Kinematic Raised Pads 50

Stage One Lock Clearance Holes 52

Z-Pin Clearance Slots 54

Stage One Retaining Spring Holes 56

Flexure Attachment Insert Feature 58

Safety Wire Holes 60

Mass Reduction Pockets 62 (first embodiment only)

Lock Plate Preload Screw Access Hole 64

The three raised pads 50 on the surface of the base plate 36 act as semi-kinematic mounting points and contact the back surface of stage one 38. The actual surface area of the pads is not large but provides ample support. The pads are raised by 1 mm to ensure that stage one 38 will not contact the base plate 36 at other points, however this value keeps the overall positioner height small. The pads are located at the optimal support radii for the mirror 4. Precision machining is important for semi-kinematic mounts. The three pads should be coplanar within ±3 $\mu$m. This ensures that, during the locking of the positioner 2, stage one 38 will not warp. To ensure smooth movement between stage one 38 and the base plate 36, solid molybdenum disulphide or other suitable lubricant is used on the pad surfaces.

The stage one lock-clearance holes 52 pass through the centre of the semi-kinematic pads 50. These holes 52 allow locking bolts 118 to pass from the rear of the base plate 36 and screw into stage one 38 without limiting the range of motion of stage one 38.

The three Z-pin clearance slots 54 allow the Z-pin actuator assemblies 12, 14 and 16, and associated spacer blocks 104, to move freely with stage one 38 without interfering with the base plate 36. The clearance slots 54 are slightly larger than necessary for the required motion of stage one 38.

There are six retaining spring holes 56 spaced evenly around each semi-kinematic pad at the same radial distance as the pads 50. The stage one retaining springs 98 preload stage one 38 against the base plate 36 during adjustment of the positioner 2. These holes 56 have a recessed slot on the rear of the base plate 36. A dowel pin is placed in this slot to hold the extension spring in place. The holes 56 are to ensure clearance between the springs, the base plate 36 and stage one 38. The holes 56 are evenly spaced around the pads 50 to minimise the deflection of stage one 38.

Around the periphery of the base plate 36 are features 58 that allow the flexure inserts to be attached to the base plate 36. There are four such features for the first embodiment 20 and three for the second embodiment 22.

There are threaded holes 60 near each flexure attachment insert feature 58. These holes 60 allow stainless steel wire to be attached to the base plate 36. The wire is attached to a similarly placed hole in the support structure 18. These wires protect the positioner and object if the flexures 32, between the support structure 18 and the six degrees-of-freedom positioner 2, fail.

The back face of the first embodiment base plate contains three mass reduction pockets 62. These pockets reduce the mass of the plate by 15% without significantly increasing flexure. These pockets do not pass completely through the base plate 36.

In the centre of the base plate 36 there is a through hole 64 that allows the lock plate preload screw to be adjusted once installed.

Associated Parts

Figure 10:
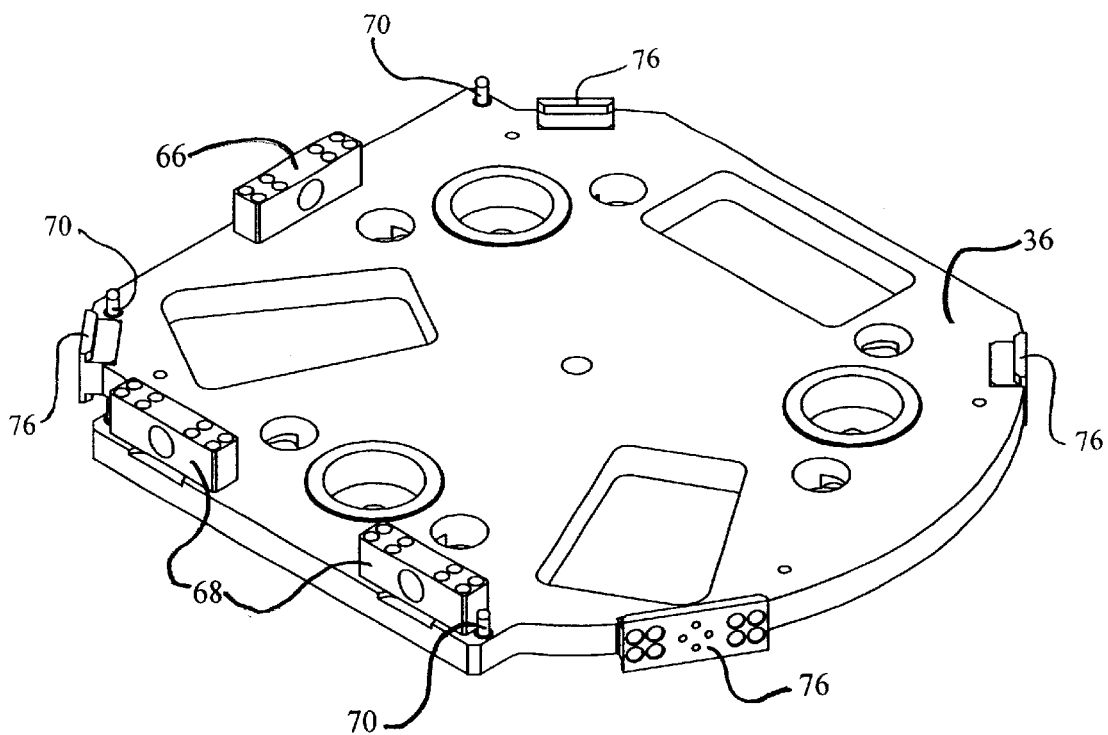
FIG. 10 is an isometric top view of the populated base plate of the positioner of FIG. 3.
Figure 11:
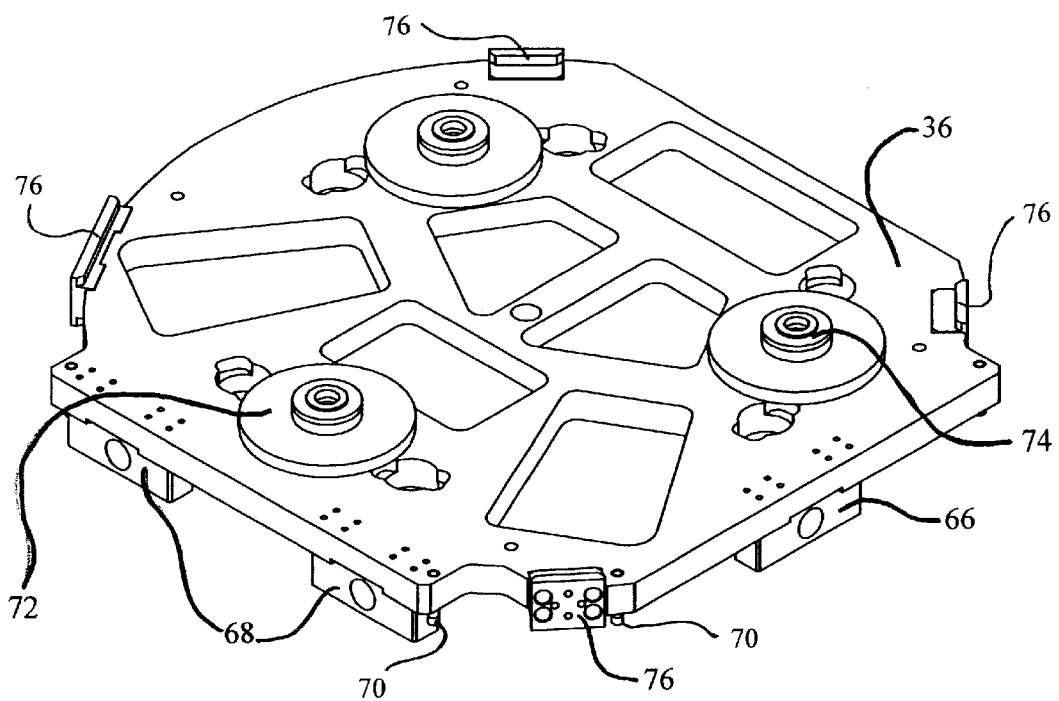
FIG. 11 is an isometric bottom view of the populated base plate of the positioner of FIG. 3.

There are a number of parts that are associated with the base plate that require mention. These components are shown in FIG. 10 and FIG. 11. The components are:

X and Y Actuator Blocks 66, 68

Actuator Preload Spring Pins 70

Oversize Washer 72

Spherical Washer Set 74

Flexure Inserts 76

The X and Y actuator blocks 66 and 68 attach to the base plate 36 and serve as mounting points for the Y1, Y2 and X actuators 6, 8 and 10 that drive stage one 38. These blocks position the Y1 and Y2 actuators 6 and 8 at one quarter and three quarters of the way along the length of stage one 38. The X actuator 10 is positioned half way along the length of stage one 38.

There are four actuator preload spring pins 70 that are pressed into the base plate 36. These pins 70 hold the actuator preload springs 100 in place during adjustment of the positioner.

The oversized washers 72 allow stage one 38 to move through its range of motion and still be secured to the base plate 36. A bolt 118 passes through the holes 52 in the centre of the pads on stage one 38. The washer 72 simply allows the bolt 118 to be used in the clearance hole 52. The washer 72 is sized to ensure that it completely covers the hole 52 for any position of stage one 38.

A spherical washer set 74 is placed between the bolt head and the oversized washer 72 on all three lock bolts 118. The spherical washer sets 74 reduce moments transmitted to stage one 38.

The flexure inserts 76 allow the flexures 32 to be attached to the base plate 36. Inserts 76 are used, instead of a direct connection to the base plate 36, so that flexures with a height greater than the height of the base plate 36 can be used and properly supported. Large flexure heights are desirable since this stiffens the flexures in planes where no deflection is preferable, but allows the flexures to remain compliant in the radial direction. If inserts were not used the base plate would have to be machined from a thicker blank.

Stage One

Stage one 38 rests on the semi-kinematic pads 50 on the base plate 36 and moves in X and Y translation as well as Z rotation. This plate is as small as possible, while still allowing all of the required features to be incorporated. The stage one plates 38 have a thickness of 12 mm and 8 mm in the first and second embodiments, respectively.

Figure 12:
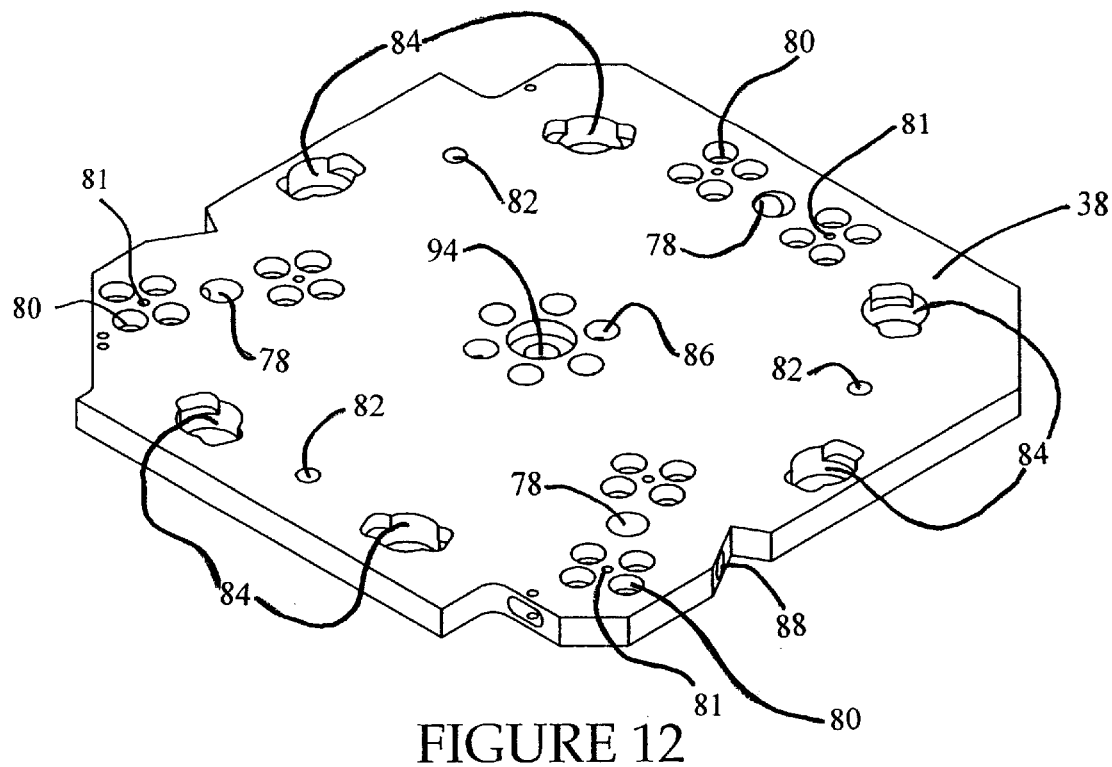
FIG. 12 is an isometric top view of stage one of the positioner of FIG. 3.
Figure 13:
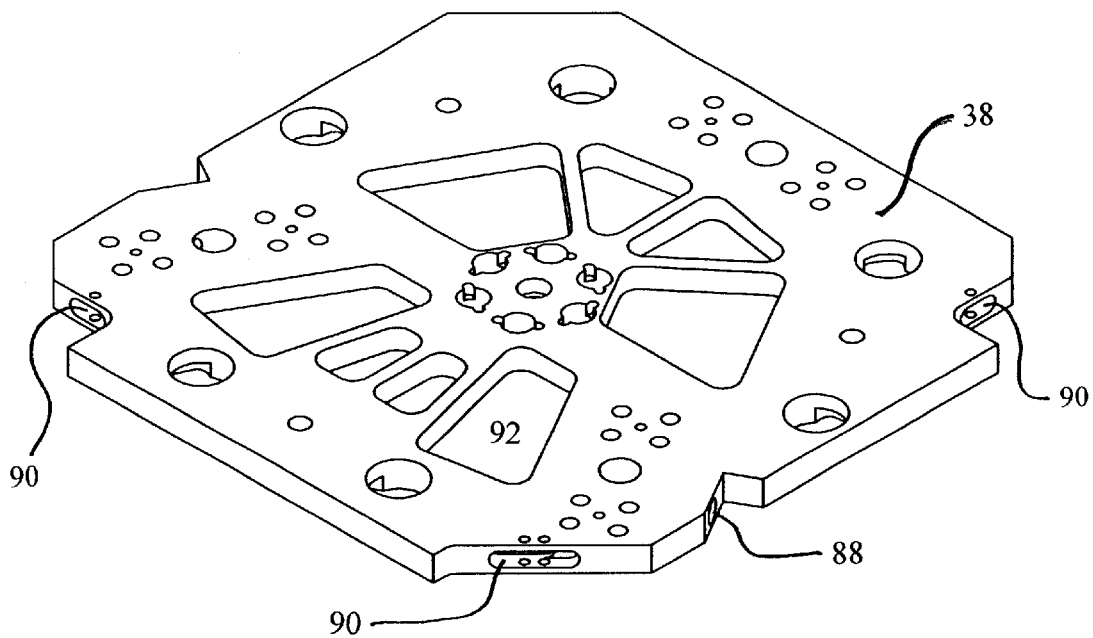
FIG. 13 is an isometric bottom view of stage one of the positioner of FIG. 3.
Figure 14:
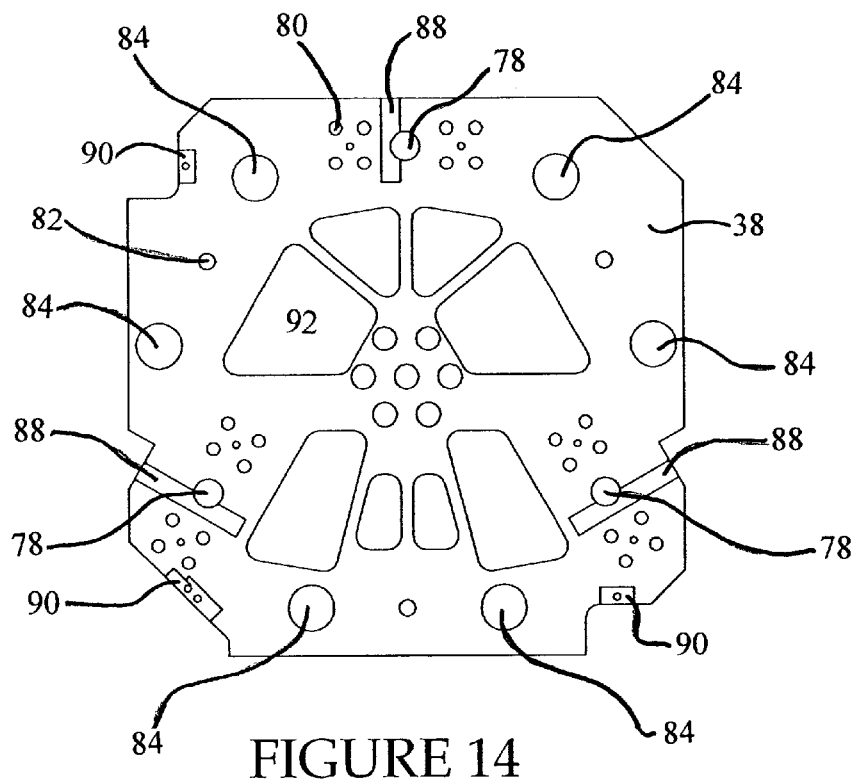
FIG. 14 is a sectional view of stage one of the positioner of FIG. 3.

Stage one 38 has nine main features that give it the required functionality. Stage one and its features are shown in FIG. 12, FIG. 13 and FIG. 14. These features are as follows:

Z-Pin Bushing Holes 78

Z-Pin Actuator Mounting Holes 80

Stage One Locking Bolt Holes 82

Stage One Retaining Spring Holes 84

Stage Two Retaining Spring Holes 86

Z-Pin Lock Shaft Holes 88

Actuator Preload Spring Clearance Slots 90

Mass Reduction Pockets 92 (first embodiment only)

Lock Plate Preload Screw Clearance and Access Hole 94

There are three holes 78 evenly spaced at 120 degrees around stage one 38. These holes 78 are positioned at the optimum support radius for the mirror. These holes 78 act as bushings and provide a sliding fit for the Z-pins 126. All three Z-pin actuator assemblies 12, 14 and 16 move with stage one 38 and these three holes 78 guide the Z-pins 126 up into contact with stage two 40.

Around each of the Z-pin bushings 78 there is a regular array of counterbored holes 80 and two dowel holes 81. These holes 80 line up with holes on the Z-pin actuator body 122 to allow attachment of the actuator assemblies 12, 14 and 16 to stage one 38. The counterbored holes 80 permit physical attachment of the Z-pin actuator assemblies 12, 14 and 16 to stage one 38 whereas the two smaller dowel holes 81 are used to accurately locate the Z-pin actuators 12, 14 and 16 under stage one 38. These dowel holes 81 are drilled after accurate alignment of the actuator assemblies has occurred.

There are three threaded holes 82 evenly spaced around stage one 38 that allow it to be locked in place. The three stage one locking bolts 118 pass up through the clearance holes 52 in the base plate 36 and thread into these three holes 82.

The stage one retaining-spring holes 84 are the counterparts to the retaining-spring holes 56 in the base plate 36. The diameter of the holes is much larger than the diameter of the springs. This is to allow clearance between the springs and the plates as stage one 38 moves relative to the base plate 36. There is also a large milled slot on top of each hole plate 84. These slots house the dowel pins that hold the extension springs in place. The slots are designed so that the dowel pins and springs can move around as stage one 38 moves relative to the base plate 36. This ensures that only a net force preloading the two plates together occurs. No net moment or forces acting in the plane of the surface of the plates will occur.

Surrounding the centre of the plate 38 are six, stage two retaining-spring holes 86. These holes house the springs 158 that preload stage two 40 against the Z-Pin 126 tips and in turn against the ramped pin 124. The extension springs are held in place by dowel pins that fit into the slots on the bottom side of the plate (FIG. 13).

There are three Z-pin lock shaft holes 88. These three holes are located so that they intersect with the Z-pin bushing holes 78. These three holes 88 accept shafts 114 that allows movement of a Z-pin 126 in its unlocked position, but secures the pin in place once the positioner has been adjusted. The lock shaft holes 88 are located in such a way that the nuts on the end of the shafts 114 themselves can be accessed and tightened once the positioner has been adjusted.

On three of the corners of stage one 38 there are slots 90 which allow the actuator preload springs 100 to be attached to stage one 38. The slots 90 have dowel pins passing through them that allow physical attachment of the spring to the plate. The slots 90 ensure that the springs do not come into contact with stage one 38 during its motion.

The back face of stage one 38 of the first embodiment contains three mass reduction pockets 92. These pockets reduce the mass of the plate by 20% without significantly increasing flexure. These pockets do not pass all the way through the plate.

In the centre of the plate, there is a counterbored hole 94 that allows access to the lock plate preload screw 194 and provides clearance for the head of the screw as it comes near the top surface of stage one 38.

Associated Parts

There are seven components associated with the operation of stage one 38. These parts are:

Stage One Micrometer Heads 96

Stage One Retaining Springs 98

Actuator Preload Springs 100

Actuator Interface Pads (not shown)

Spacer Blocks 104

Z-Pin Lock Shafts and Nuts 114

Stage One Lock Bolts 118

Three actuators 6, 8 and 10 control the three degrees-of-freedom of stage one 38. The X-block 66 and Y-blocks 68, hold these actuators in position. In the first embodiment 20, Newport BM17.25 actuators are used, while in the second embodiment 22, Newport SM-13 actuators are used. Each selected actuator can be directly replaced with a differential micrometer (Newport BD17.25 and Newport DM-13) that will increase the resolution of the stage approximately ten times. Table 1 lists the actuators used for each embodiment as well as the desired travel range and resolution for each degree-of-freedom for each embodiment.

TABLE 1

Stage One Actuators

| Positioner Embodiment | Required X Translation Travel | Required X Translation Resolution | Required Y Translation Travel | Required Y Translation Resolution | Required Z Rotation Travel | Required Z Rotation Resolution | Selected Actuator | Published Actuator Resolution | Actuator Travel | Possible Replacement Actuator |
|---|---|---|---|---|---|---|---|---|---|---|
| First | ±2 mm | ±5 µm | ±2 mm | ±5 µm | ±5 deg | ±7 asec | Newport BM17.25 | 1 µm | 25 mm | BD17.25 |
| Second | ±2 mm | ±5 µm | ±2 mm | ±5 µm | ±5 deg | ±7 asec | Newport SM-13 | 1 µm | 13 mm | DM-13 |

There are six stage one retaining springs 98 (FIG. 21) that preload stage one 38 against the base plate 36 during adjustment of the positioner. Since the positioner is adjusted with the XY plane in a vertical orientation, the springs 98 prevent stage one 38 from separating from the base plate 36. However, to decrease the frictional forces between stage one 38 and the base plate 36, these springs are sized to ensure contact only when the positioner 2 is in a vertical position. The springs 98 are not capable of holding stage one 38 and all of the positioner components after it against the base plate 36 if the positioner is turned so that the mirror 4 faces the floor. Due to the orientation of the mount during the adjustment, the springs 98 in the most positive Y position take most of the load. To reduce frictional forces between the plates, these two springs are sized significantly larger to provide the restoring moment required, while the remaining four springs ensure equal normal forces on the two lower semi-kinematic pads. In situations where adjustment is required in another orientation, these springs can be resized accordingly.

Figure 15:
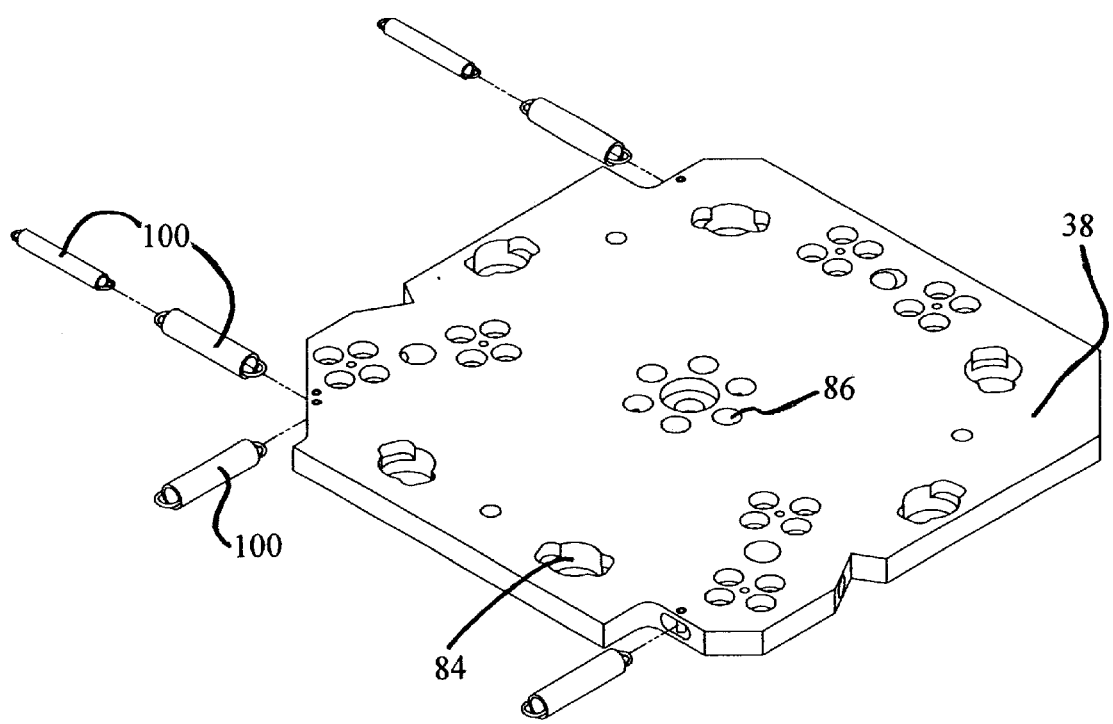
FIG. 15 is the same as FIG. 12, but shows the location of the actuator preload springs.

The actuator preload springs 100 are used to preload stage one 38 against the Y1, Y2 and X actuators 6, 8 and 10 during adjustment of the positioner 2. The first embodiment 20 uses six springs and the second embodiment 22 uses four springs. In the first embodiment 20, only four springs are visible as the other two springs are placed inside the two springs that hold stage one 38 against the X Actuator 10 (FIG. 15). This is done to ensure appropriate applied forces while not exceeding the yield strength of the spring material.

Actuator interface pads (not shown) reduce the contact stress between the spherical tips of the Y1, Y2 and X actuators 6, 8 and 10 and the sides of stage one 38. These pads change the contact geometry from a point contact to a ring contact. This prevents local plastic deformation at the surfaces and assures smooth movement of stage one 38. This part is manufactured from drill rod and is oil quenched to increase its hardness.

Figure 20:
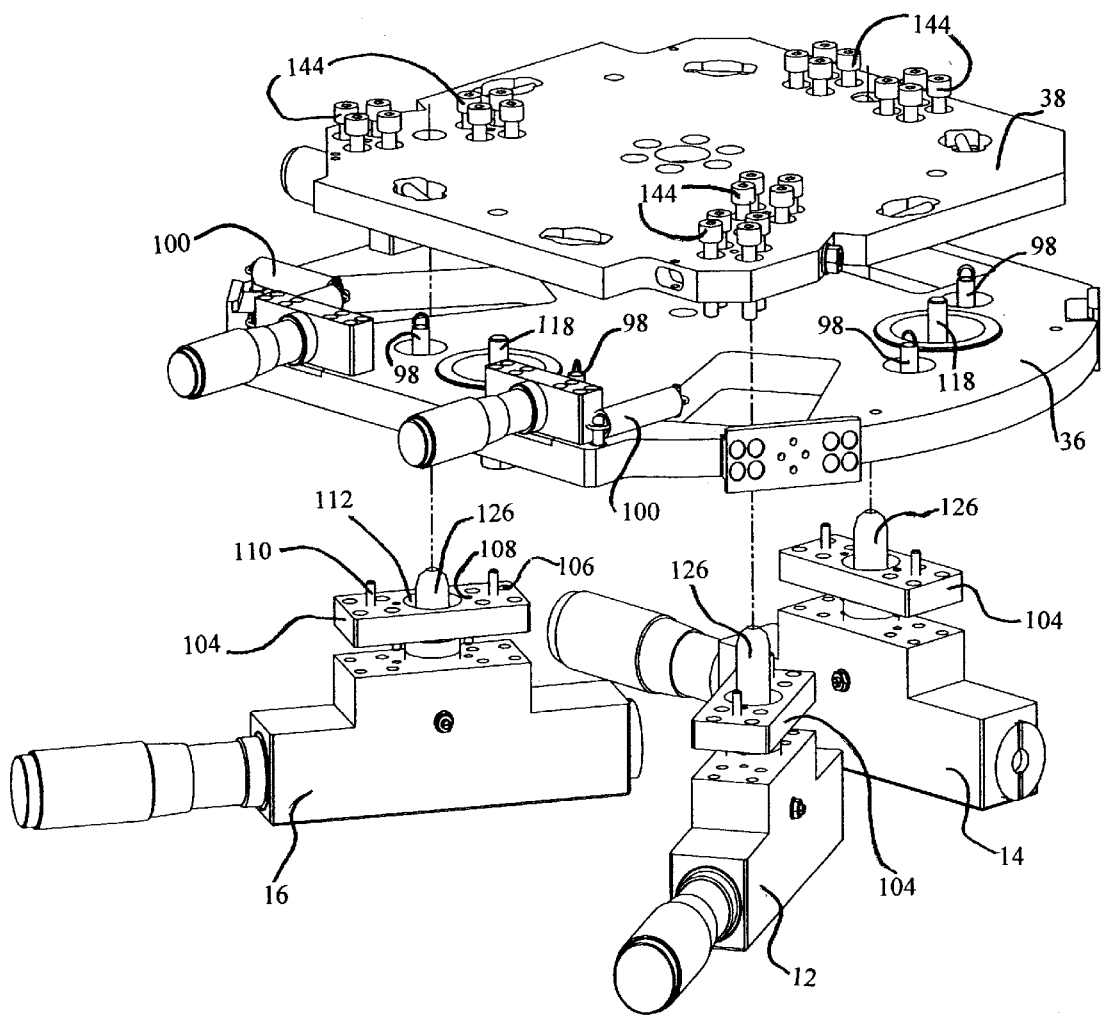
FIG. 20 is an exploded view of FIG. 19.

There is a spacer block 104 for each Z-pin actuator assembly 12, 14 and 16 in both embodiments (FIG. 20). These blocks 104 sit between stage one 38 and the Z-pin actuator bodies 122. All of the holes 106 are clearance holes. The inner two dowel holes 108 are used to pin the block 104 to a Z-pin actuator assembly 12, 14 and 16. The outer two dowel holes 110 are used to pin a Z-pin actuator assembly 12, 14 and 16 and spacer block 104 to stage one 38. The large central hole 112 fits over the Z-pin 126.

There are three lock shafts 114 (FIG. 19B) that are used to lock the Z-pins 126 in place. These shafts allow free movement of the Z-pins 126 during adjustment. However, one end 116 of the shaft is threaded to allow a nut to be threaded on the shaft. Tightening these nuts causes the Z-pin lock shafts 114 to act as a wedge and lock the Z-pins 126 in place. This mechanism prevents movement of the Z-pins 126 perpendicular to stage one 38.

Figure 16:
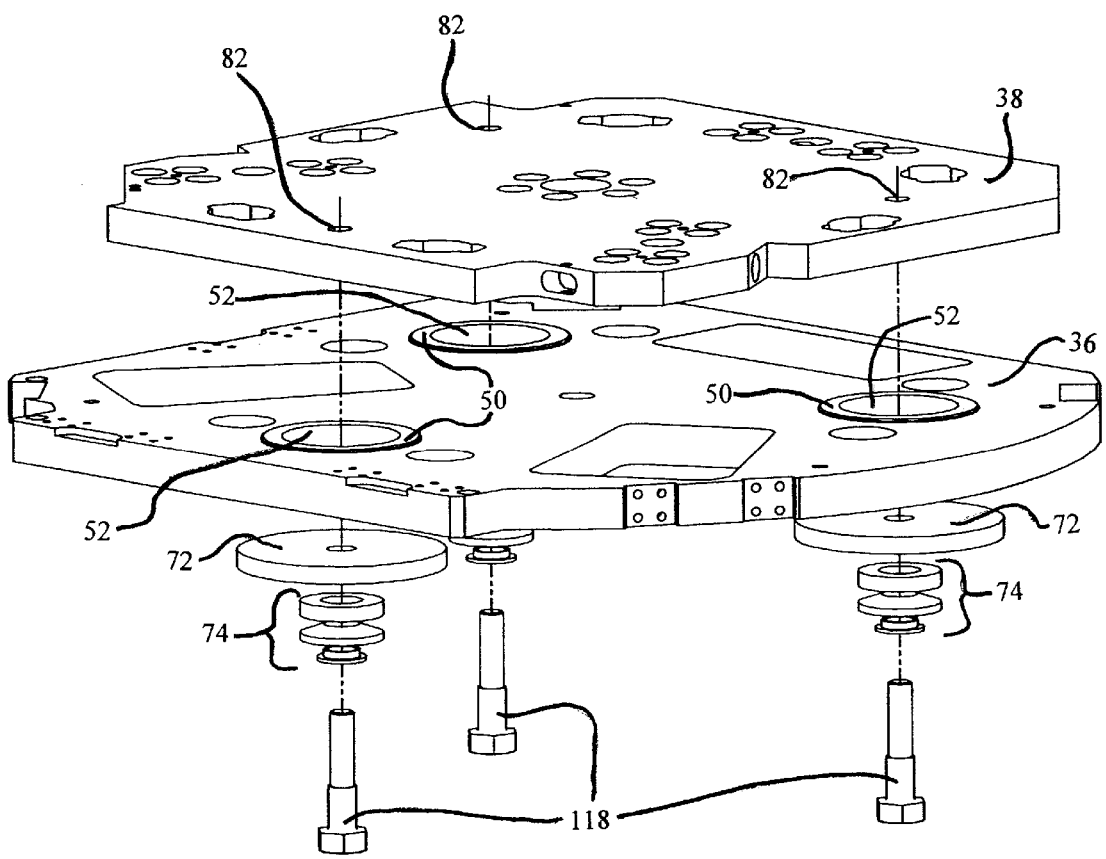
FIG. 16 is an exploded isometric view of the base plate and stage one of the positioner of FIG. 3, showing the stage one locking bolt assemblies.

The three stage one lock bolts 118 pass through the spherical washer set 74, oversize washer 72 and the base plate 36 before they screw into a threaded hole 82 in stage one 38 (FIG. 16). These bolts 118 function in two modes. The first mode is when the positioner is being adjusted. The stage one retaining springs 98 are not capable of supporting the entire mass of a mirror and positioner components after the base plate 36, if the positioner 2 is oriented so that the mirror faces the floor. To prevent mechanical failure of the positioner in case this situation occurs, the stage one locking bolts 118 are loosened ½ a turn from the snug position during adjustment of the positioner. This ensures that complete separation will not occur but still allows the positioner 2 to be adjusted easily. The second mode of operation is when the bolts 118 are used to lock stage one 38 against the base plate 36.

Z-Pin Actuator Assemblies

Figure 17:
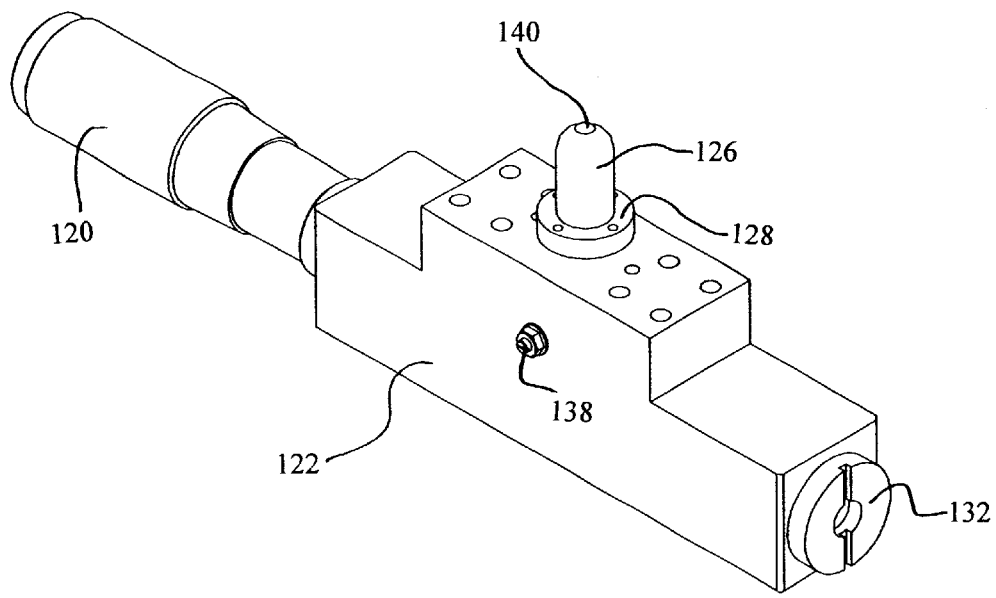
FIG. 17 is and isometric view of a Z-pin actuator assembly.
Figure 18:
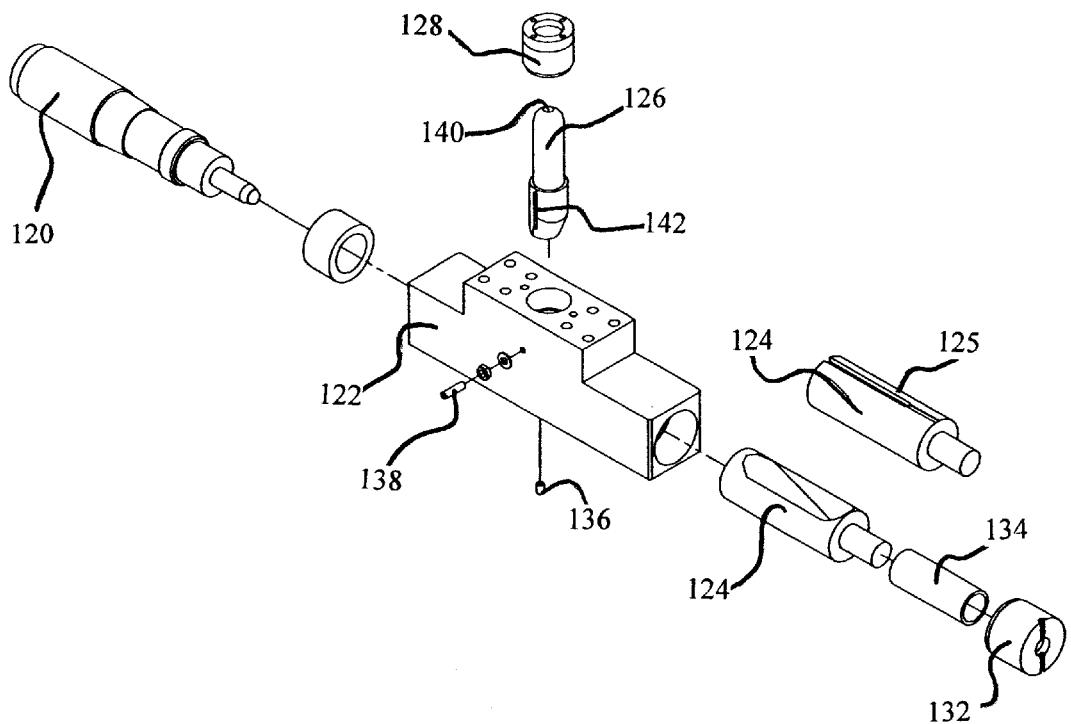
FIG. 18 is an exploded view of the Z-pin actuator assembly of FIG. 17.
Figure 19A:
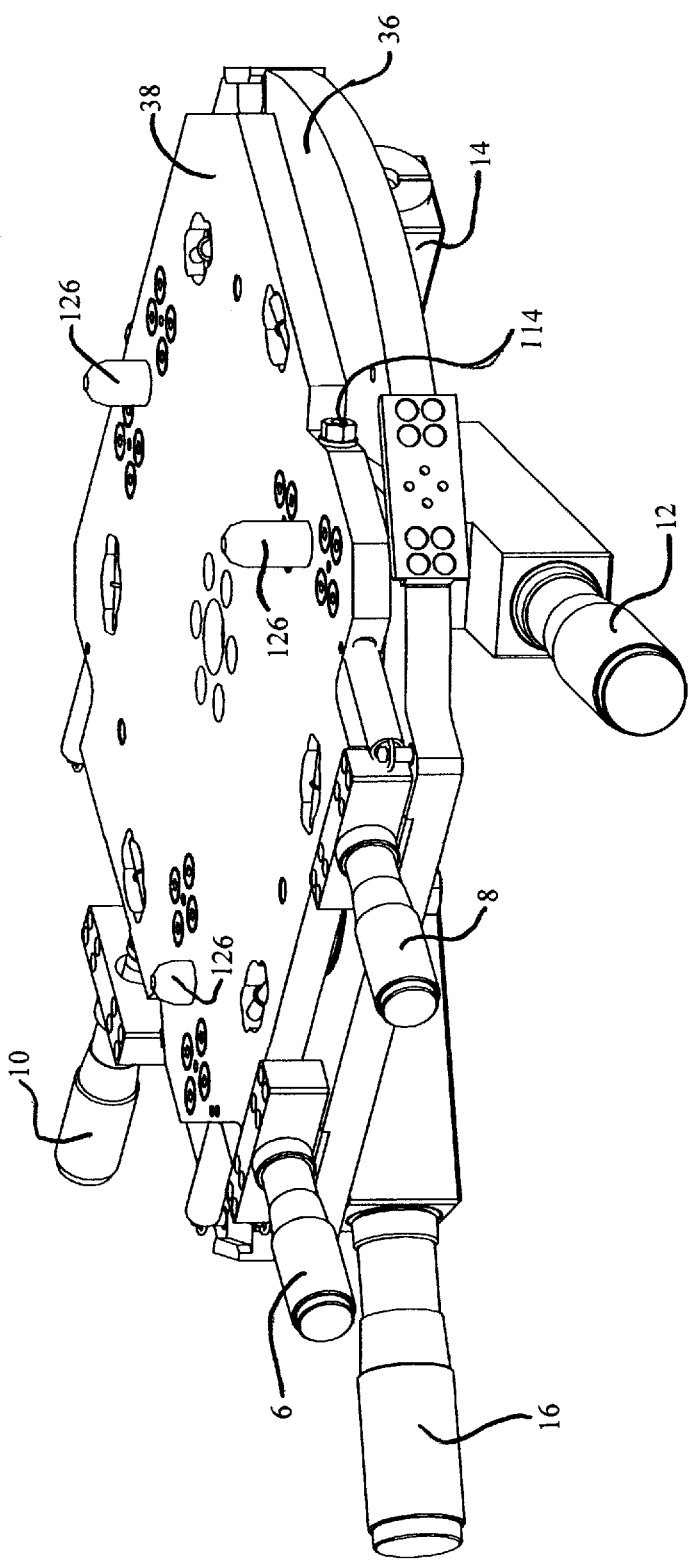
FIG. 19A is an isometric view of the base plate, stage one and Z-pin actuator assemblies of the positioner of FIG. 3.
Figure 19B:
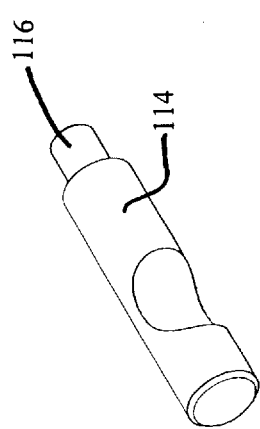
FIG. 19B shows a Z-pin lock shaft.

The Z-pin actuator assemblies 12, 14 and 16 control the X rotation, Y rotation and Z translation of stage two 40. FIG. 17 and FIG. 18 show the assembly alone. FIG. 19 and FIG. 20 show the Z-pin actuator assemblies in relation to the rest of the six degrees-of-freedom positioner discussed thus far. The main parts in these Z-pin actuator assemblies 12, 14 and 16 are:

Micrometer Head 120

Actuator Body 122

Ramped Pin 124

Z-Pin 126

Z-Pin Guide Nut 128

Z-Pin Return Spring (not shown)

Ramped Pin Spring Nut 132

Ramped Pin Return Spring 134

Ramped Pin Guide Dowel 136

Z-Pin Guide Screw 138

In each Z-pin actuator assembly 12, 14 and 16, the ramped pin 124 multiplies the resolution of the micrometer by the slope of the ramp. For a slope of ⅖, which is used in the first 20 and second 22 embodiments, a 10 micron micrometer motion becomes 4 microns at the tip of the Z-pin 126. Table 2 indicates required motions and the actuators selected for each positioner. If the actuators selected do not provide sufficient resolution, the micrometers for the second embodiment 22 can be replaced with the one listed in the last column to increase the resolution by a factor of 10. Table 2 lists the actuators used for each embodiment as well as the desired travel range and resolution for each degree-of-freedom for each embodiment.

TABLE 2

Z-Pin Assembly Actuators

| Embodiments | Required X Rotation Travel | Required X Rotation Resolution | Required Y Rotation Travel | Required Y Rotation Resolution | Required Z Translation Travel | Required Z Translation Resolution | Selected Actuator | Published Actuator Resolution | Actuator Travel | Possible Replacement Actuator |
|---|---|---|---|---|---|---|---|---|---|---|
| First | ±2 deg | ±3 asec | ±2 deg | ±3 asec | ±2 mm | ±3 μm | Newport BM25.40 | 1 μm | 40 mm | NA |
| Second | ±2 deg | ±3 asec | ±2 deg | ±3 asec | ±2 mm | ±3 μm | Newport BM17.25 | 1 μm | 25 mm | BD17.25 |

The Z-pin actuator body 122 is made from the same material as the main plates. The body 122 guides the ramped pin 124 using a hole-basis sliding fit to accurately guide the ramped pin 124. A dowel hole in the bottom of the body 122 houses a guide dowel 136 that passes into a guide groove 125 in the ramped pin 124 to prevent it from rotating. There is also an array of holes on the top of the body 122 that allow location and attachment to stage one 38. The body 122 also guides the lower section of the Z-pin 126 accurately. A threaded hole in the side of the body 122 intersects the Z-pin bore and houses a Z-pin guide screw 138 that prevents the Z-pin 126 from rotating. Finally, the body has a number of threaded holes that allow special nuts to be inserted which help guide the Z-pin 126 and retain the ramped pin 124.

The ramped pin 124 is manufactured from a good bearing material (bronze in this case). This reduces friction around the pin. The ramped pin 124 has a slope of ⅖, which is a compromise between accuracy and size. The pin has a small protrusion on one of its faces to guide the ramped pin return spring 134. On the opposing face a small conical cut has been made to reduce the contact stress between the micrometer head 120 and the ramped pin 124. If the micrometer had a flat tip the conical cut would not be present. On the bottom of the pin 124 is a small groove 125 that accepts a dowel pin 136 that prevents rotation of the ramped pin 124 (FIG. 18).

Figure 24:
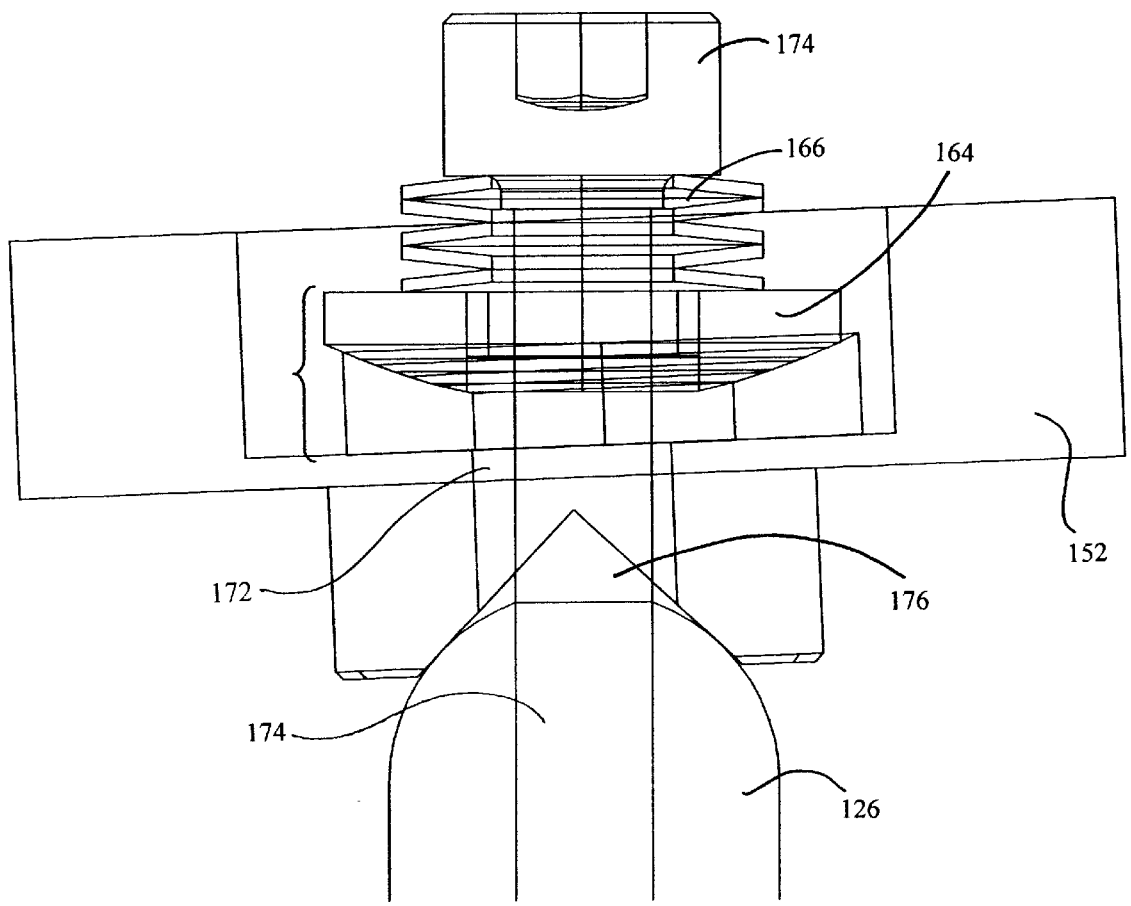
FIG. 24 is a cross-sectional view of a Z-pin contact insert in use, showing a Z-pin held in place with a bolt.

The Z-pin 126 is made from the same material as the actuator body 122. This pin 126 contacts the ramped pin 124 and moves perpendicular to the direction of travel of the ramped pin 124. The Z-pin 126 contacts the ramped pin 124 with a line contact. The tip of the Z-pin 126 is spherical which makes contact with the Z-pin contact insert 152 in stage two 40. A threaded hole 140 in the tip of the Z-pin 126 is also present which allows a screw to ensure a solid mechanical contact between the tip and stage two 40 (FIG. 24). The pin also has a vee-shaped groove 142 that is in contact with the Z-pin guide screw 138 to prevent rotation. The first embodiment 20 has a Z-pin diameter of 12 mm while the second embodiment 22 Z-pin has a diameter of 6 mm. These diameters minimize the bending of the Z-pins 126 due to gravitational loading from the mirrors to approximately 1 micron in each case. The contact stress is also significant between the Z-pins 126 and the Z-pin contact inserts 152. Therefore, the Z-pins 126 and Z-pin contact inserts 152 are hardened and ground. The tolerances between each Z-pin 126 and its bushing 78 in stage one 38 are very close. This is to reduce the amount of lateral movement that occurs when the Z-pin lock shafts 114 are tightened against the Z-pins 126. The Z-pins 126 and bushings 78 are sized as a hole-basis sliding fit. The positioners 22 and 20 also have three Z-pins of different lengths. This allows the mirror to be oriented at some initial arbitrary tip/tilt with respect to the base plate 36. This is done to ease the mounting of the base plate 36 by not requiring it to be planar parallel to the mirror 4.

The Z-pin guide nut 128 is used to aid in the accurate guiding of the Z-pin 126.

A compression spring (not shown) can be used between the Z-pin 126 and the Z-pin guide nut 128. This spring provides extra restoring force to ensure that the Z-pin 126 remains in contact with the ramped pin 124.

The ramped pin spring nut 132 is installed in the body 122 and holds the ramped pin return spring 134 in place during operation of the positioner 2.

The ramped pin return spring 134 ensures that the ramped pin 124 tracks well with the movement of the micrometer head 120. This spring is sized so that the force generated by the compression spring in its extended position is greater than the frictional force between the ramped pin 124 and the Z-pin 126. The frictional force between the two pins is due to the masses of the positioner components, the object being positioned, and the force generated by the stage two retaining springs 158 and the Z-pin return springs (not shown). The Z-pin return springs assist the stage two retaining springs 158 in ensuring that the Z-pin 126 remains in contact with the ramped pin 124.

The ramped pin guide dowel 136 is present to ensure that the ramped pin 124 does not rotate in its bore in the actuator body 122. This dowel 136 is press fit into the actuator body 122.

Each actuator body 122 has a threaded hole that allows a set screw 138 to be passed though to intersect the Z-pin 126. A cone point set screw 138 is used and runs into the vee-shaped groove 142 in the Z-pin 126 to prevent it from rotating and damaging the surface finish of the ramped pin 124.

Each actuator body 122 is attached to stage one 38 by Z-pin actuator mounting bolts 144.

Stage Two

Figure 21:
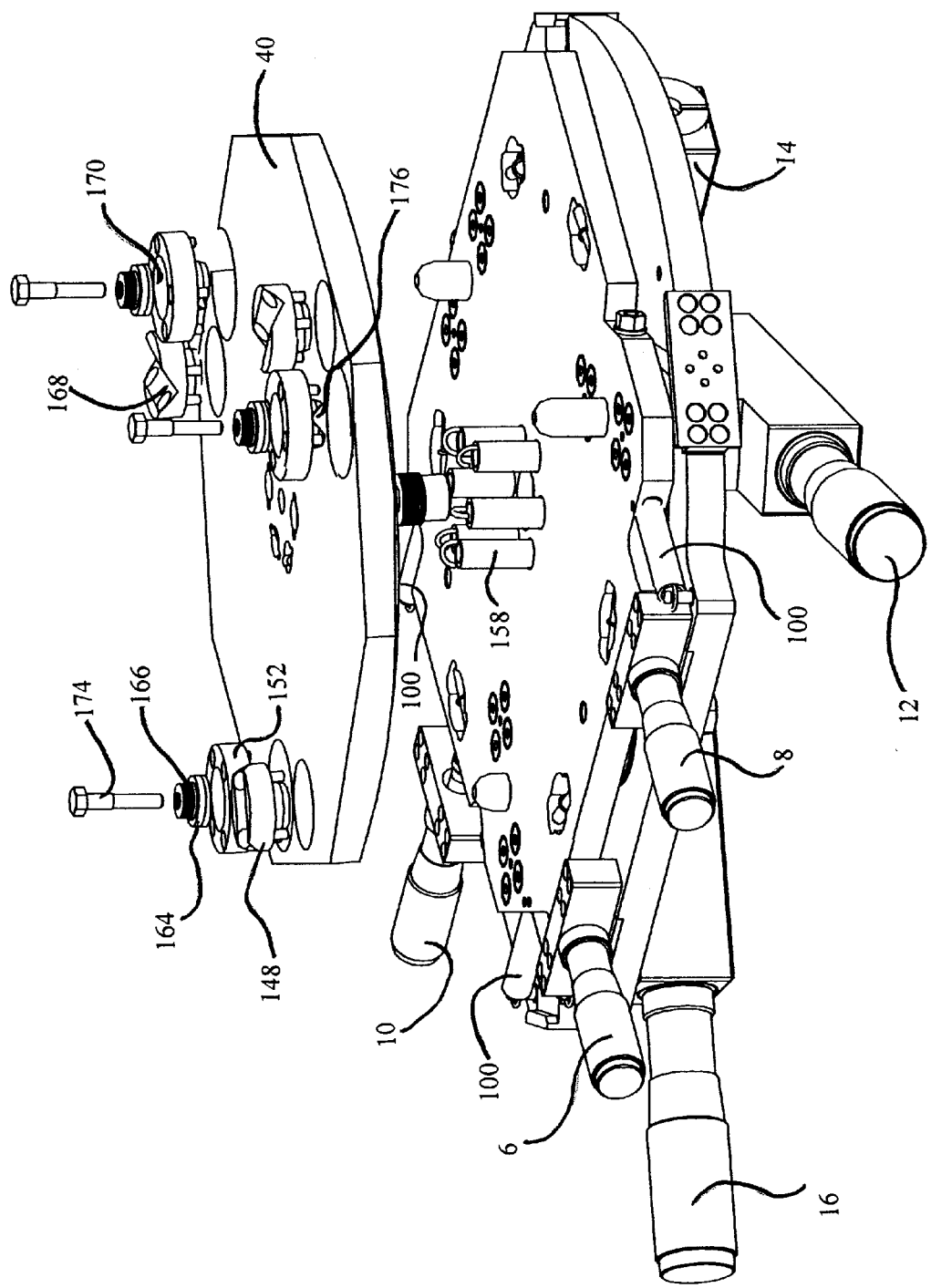
FIG. 21 is the same as FIG. 19, but also shows the stage two components of the first embodiment in exploded view.

Stage two 40 rests on the tips of the three Z-pins 126 and moves in X and Y rotation as well as Z translation (FIG. 21). Differential motions of the Z-pins 126 provide X and Y rotation and equal movements of the Z-pins provide translation in the Z direction.

Stage two 40 is manufactured from the same material as the base plate 36. As with stage one 38, the radial distances at which the Z-pins contact the plate govern the dimensions of stage two. Large chamfers on the corner of stage two 40 reduce its mass. These plates are subject to large point loads and must be very stiff to ensure adequate flexural performance of the positioner.

Figure 22:
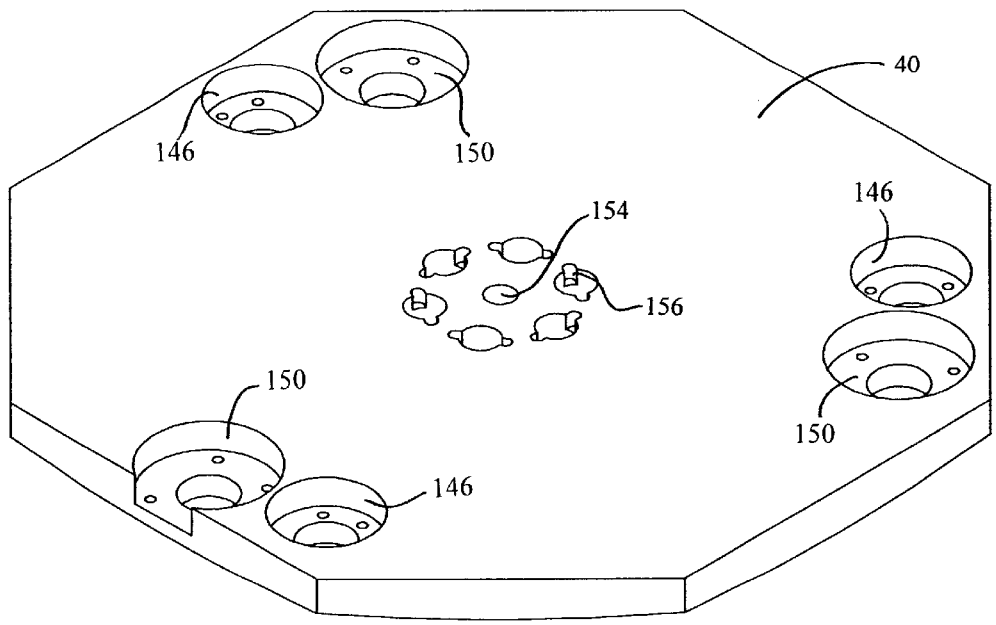
FIG. 22 is an isometric top view of stage two of the positioner of FIG. 3.
Figure 23:
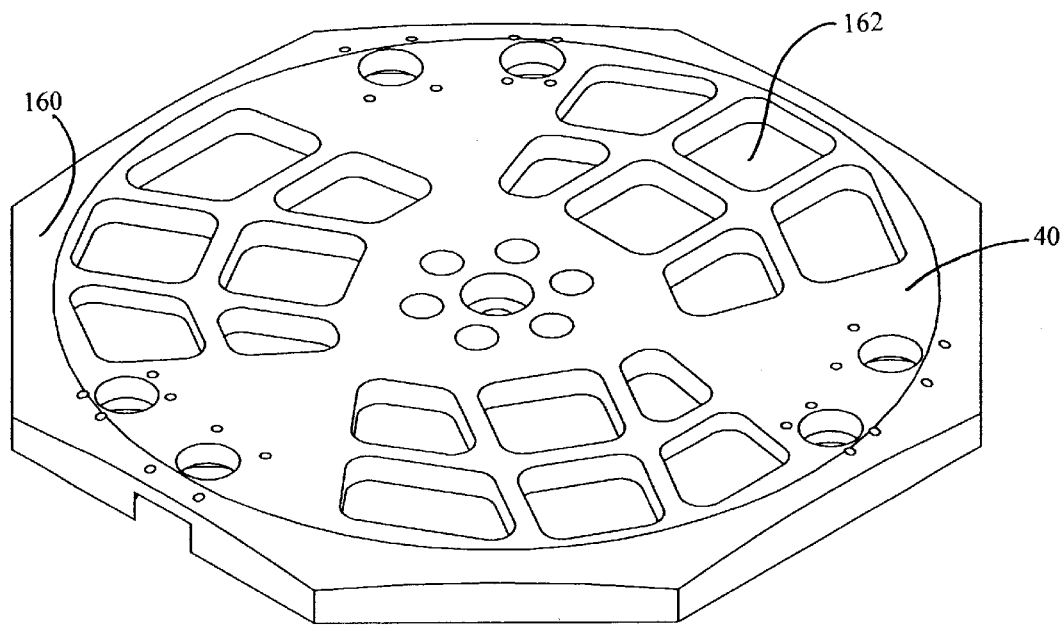
FIG. 23 is an isometric bottom view of stage two of the positioner of FIG. 3.

Stage two 40 has six main features shown in FIGS. 21, 22 and 23. These features are:

Tooling Ball Contact Insert Holes 146
Z-Pin Contact Insert Holes 150
Shoulder Screw Hole 154
Stage Two Retaining Spring Holes 156
Stage One Clearance Chamfer 160
Mass Reduction Pockets 162 (first embodiment only)

The tooling ball contact insert holes 146 house, and provide attachment for, tooling ball contact inserts 148. The Z-pin contact insert holes 150 house, and provide attachment for, Z-pin contact inserts 152.

In the centre of stage two 40 there is a counterbored hole 154. The through hole section of this feature supports the shoulder screw 194 that screws into the lock plate 44. The larger diameter counterbore allows a stack of Belleville spring washers 196 to be placed between the head of the shoulder screw 194 and the bottom of stage two 40.

Surrounding the centre counterbore hole 154 are six stage two retaining-spring holes 156. These holes house six springs 158 that preload stage two 40 towards stage one 38. These holes use a similar pin system to retain the springs as the stage one retaining springs 98.

Around the perimeter of stage two 40 there is a chamfer 160 on the bottom surface that prevents stage two 40 from contacting stage one 38 at the extremes of its motion.

In the first embodiment 20, there are a number of mass reduction pockets 162 in stage two 40. These reduce the mass of the plate by 18% without significantly increasing the flexure of the plate.

Associated Parts

There are five components associated with the operation of stage two 40. These parts are:

Tooling Ball Contact Inserts 148

Z-Pin Contact Inserts 152

Stage Two Retaining Springs 158

Stage Two Spherical Washers 164

Stage Two Lock Belleville Spring Washers 166

The tooling ball contact inserts 148 are manufactured from a hardenable grade of stainless steel. Each insert contains a triangular groove 168 passing through the centre of the insert (FIG. 21). Since these inserts are subjected to high contact stress they are hardened to prevent plastic deformation in the contact area from occurring. The contact surfaces are also ground to ensure smooth contact. These parts are manufactured as inserts rather than being incorporated into stage two 40 directly. This allows surface hardening and grinding operations, as mentioned above, to be carried out. The three vee-shaped grooves 168 in these inserts 148, in conjunction with the tooling balls 178 themselves, define a kinematic clamp between stage two 40 and the transition plate 46.

The Z-pin contact inserts 152 are present for the same reasons as the tooling ball contact inserts 148. These inserts contain a large diameter counterbore 170 to allow space for a spherical washer set 164 and a smaller through hole 172 to allow a bolt 174 to be screwed into the Z-pin 126 (FIG. 21). Each Z-pin contact insert 152 also includes a groove 176 for contacting the tip of the Z-pin 126. The three vee-shaped grooves 176 in these inserts 152, in conjunction with the spherical tips of the Z-pins 126, define a kinematic clamp. Therefore, for an arbitrary position for each Z-pin 126 tip, there is exactly one orientation of stage two 40.

A spherical washer set 164 is positioned in the counterbore of each Z-pin contact insert 152. Stage two 40 does not remain perpendicular to the Z-pins 126 and so these spherical washers 164 are required to provide a way to secure the bolt 174 through stage two 40 into each Z-pin 126. These washers 164 allow stage two 40 to be bolted into place in any orientation while having the bolts 174 pass properly into the Z-pin 126 tips (FIG. 24).

On top of each of the spherical washer sets 164, there is a stack of Belleville spring washers 166 in series. These washers, when compressed, ensure that stage two 40 will always stay in contact with the tips of the Z-pins 126. The spring washers are sized so that they load stage two 40 against the Z-pin 126 tips with two times the weight of the positioner components from stage two out to, and including, the object to be positioned.

The six stage two retaining springs 158 are used to ensure that, during adjustment of the positioner 2, the Z-pins 126 tracks well with the motion of the ramped pin 124 in each Z-pin actuator assembly 12, 14 and 16. These springs are sized to overcome the moments from the cantilevered plates and object and, as mentioned, to supply a suitable force between the Z-pins 126 and the ramped pin 124. Due to the arrangement of the springs and the adjustment positions, the springs in the most positive Y direction are largest, as they are most able to counteract the moments from the plates and object. In the least extended state of the springs, which occurs when stage two 40 is at its most negative Z translation and at some maximum tip and tilt, the springs must still be capable of loading the Z-pins 126 against the ramped pins 124 with a suitable force. In situations where adjustment of the positioner 2 is required in another orientation these springs can be resized accordingly.

Lock Plate

Figure 25:
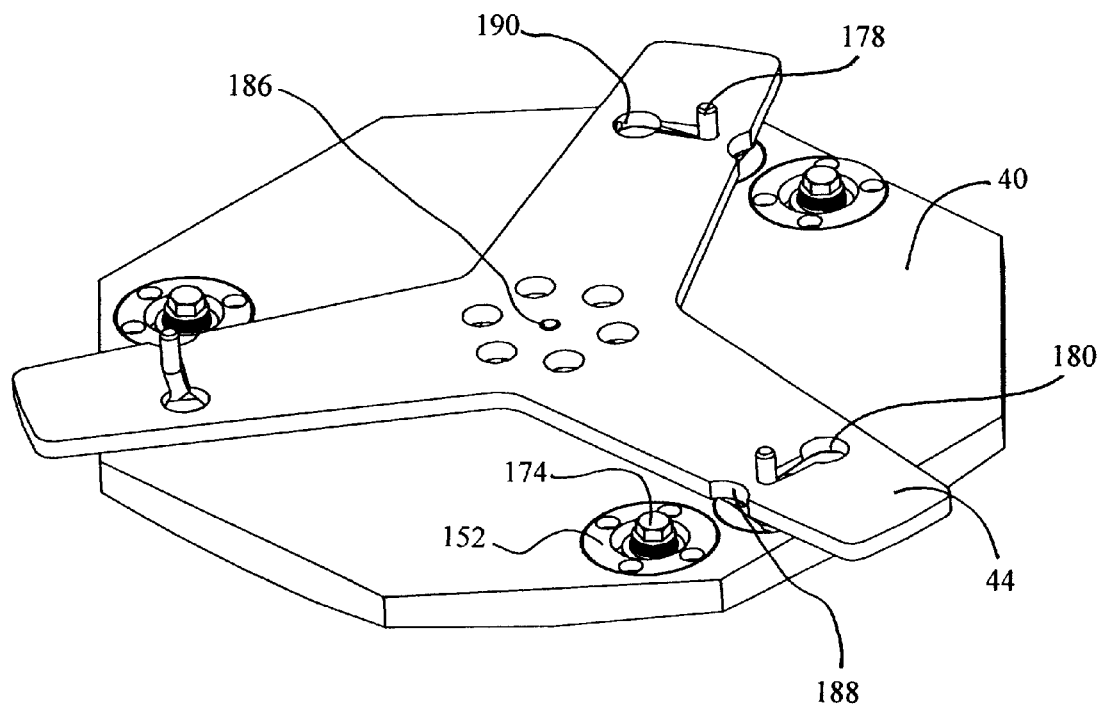
FIG. 25 is an isometric view of a lock plate and stage two, in locked position, of the positioner of FIG. 3.
Figure 26:
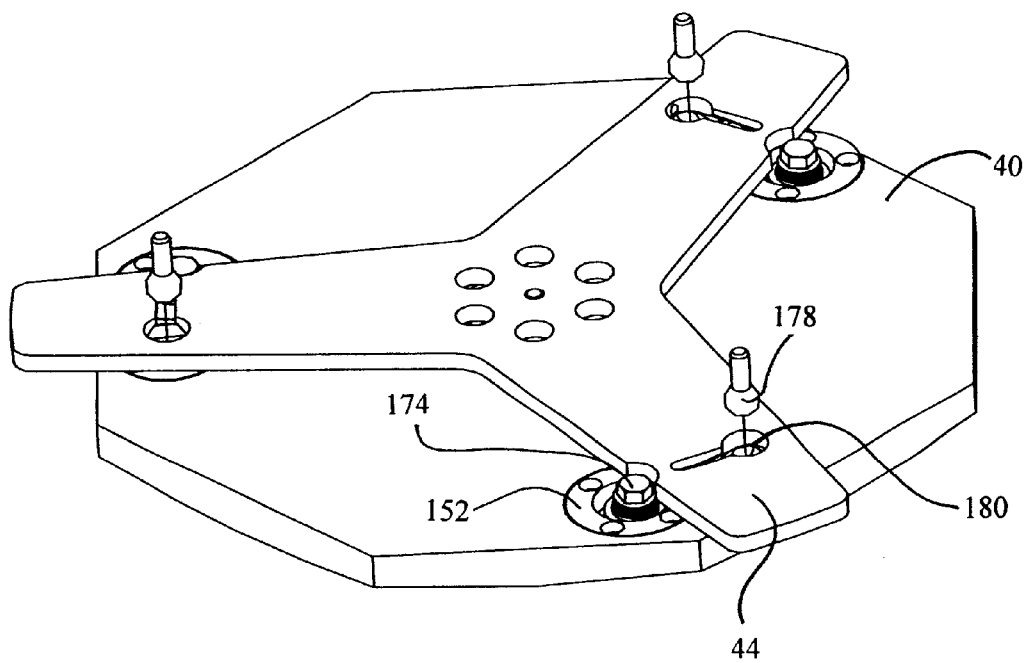
FIG. 26 is an isometric view of a lock plate and stage two, in unlocked position, of the positioner of FIG. 3.

The lock plate 44 is the final moving part of the six degrees-of-freedom positioner. While the lock plate 44 does not allow adjustment of the positioner in any degrees-of-freedom, it is an important part of the positioner if the object to be positioned is a mirror. One feature of the positioner 2 is that it allows a mirror 4 to be removed and replaced with a high degree of repeatability to accommodate mirror re-coating. The lock plate 44 is one half of the mechanism that allows this to be possible. The function of the lock plate 44 is to either hold tooling balls 178, which are attached to the transition plate 46, securely in their vee-shaped grooves 168, or to allow the tooling balls 178, and thus the transition plate 46, to be released from the rest of the positioner 2. Moving from the locked position to the unlocked position can be accomplished simply by rotating the lock plate 44. FIG. 25 shows the lock plate 44 oriented in a position that locks the tooling balls 178 in place. FIG. 26 shows the lock plate 44 in the unlocked position.

The lock plate 44 is manufactured from the same material as the base plate 36 and consists of three symmetric spokes that each contain the same features for locking of the tooling balls 178. The radius of the plate, and thus the length of each spoke from the centre of the plate, is governed by the position of the tooling balls 178 while allowing physical access to the spokes. Each spoke protrudes from the side of the positioner 2 so that the lock plate 44 can be turned by hand.

The lock plate 44 has six main features. The lock plate 44, with labeled features, is shown, for example, in FIGS. 25 and 26. The six features are as follows:

Tooling Ball Release Hole 180

Contact Groove 182

Tooling Ball Lock Groove (not shown)

Shoulder Screw Threaded Hole 186

Clearance Slot 188

Lock Bolt Hole 190

In each of the spokes there is a tooling ball release hole 180. These clearance holes allow the tooling balls 178 to pass through the lock plate 44.

Proceeding clockwise from the tooling ball release hole 180 is the contact groove 182 (FIG. 27) which approximates a helix with a triangular cross section. As the lock plate 44 is rotated counter-clockwise from the tooling ball release holes 180, the contact groove 182 causes the lock plate 44 to rise approximately 1 mm which in turn causes the spring washers 196 to be compressed. Towards the end of the contact groove 182 a small lip (not shown) is present that prevents accidental rotation of the lock plate 44 once it is in its locked position. When this lip is in contact with the tooling balls 178, the maximum force between the contact grooves 182 and the tooling balls 178 occurs. Once the lock plate 44 has been rotated counter-clockwise past the safety lips, the tooling balls 178 snap into their locking grooves (not shown). In the locked orientation of the lock plate 44, a force equal to two times the mass of the applicable mirror and positioner components that the lock plate 44 must retain is applied to the tooling balls 178. The lock grooves (not shown) ensure that the tooling balls 178 remain in contact with the tooling ball inserts 148 in stage two 40, without imposing significant kinematic constraints on the system.

A threaded hole 186 is present in the centre of the lock plate 44 for the shoulder screw 194 to thread into.

There are three clearance slots 188 in the lock plate 44 that provide clearance for the heads of the screws 174 that secure stage two 40 to the Z-pins 126.

There is a threaded hole 190 in the side of one blade of the lock plate 44. This hole passes through into a tooling ball release hole 180. Once the lock plate 44 is moved to its locked position, a screw is threaded into this hole to prevent the lock plate 44 from becoming unlocked.

Associated Parts

There are three components associated with the operation of the lock plate 44. They are:

Shoulder Screw 194

Lock Plate Belleville Spring Washers 196

Lock Bolt (not shown)

Figure 27:
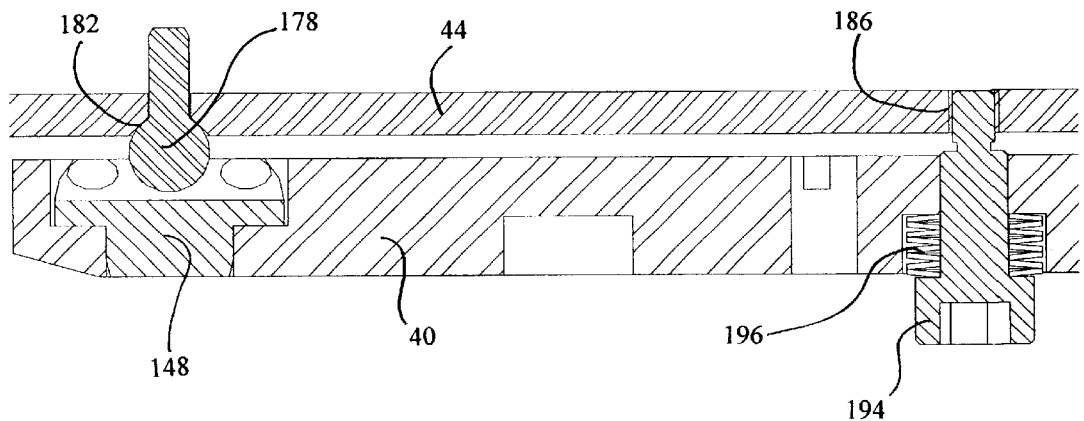
FIG. 27 is a partial cross-sectional view of FIG. 25, showing the shoulder screw holding the lock plate on stage two.

A stack of Belleville spring washers 196 are used to apply a force to the tooling balls 178 through the lock plate 44 (FIG. 27). These spring washers are positioned between the head of the shoulder screw 194 and the underside of stage two 40. When the shoulder screw 194 is tightened, it causes a force to be applied to the lock plate 44 in the negative Z direction. It is this force that holds the tooling balls 178 in place. These springs washers 196 are sized so that in the locked position of the lock plate 44, the springs load the tooling balls 178 against the tooling ball contact inserts 148 in stage two 40 with two times the weight of the transition plate 46 and mirror 4.

The shoulder screw 194 is used to locate and load the lock plate 44. The stack of spring washers 196 is placed on the body of the screw. Tightening or loosening this screw determines the forces that are applied to the tooling balls 178 in the locked and unlocked position.

The lock bolt (not shown) is used to prevent accidental unlocking of the lock plate 44. The bolt passes through the clearance hole 180 and into the contact groove 182 but does not actually come into contact with the tooling ball 178. The length of the bolt prevents the lock plate 44 from rotating past the safety lip.

Transition Plate

Figure 28:
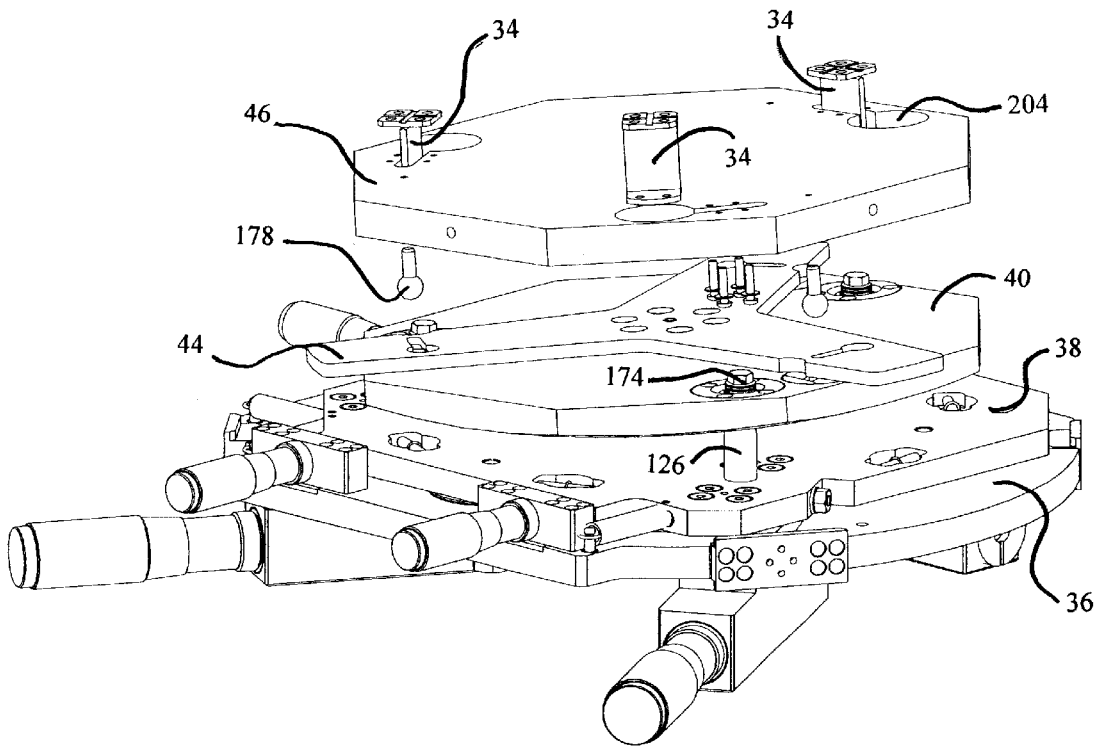
FIG. 28 is an isometric view of the base plate, stage one, stage two, lock plate and transition plate of the positioner of FIG. 3, partially exploded to show tooling balls and flexure bolts, and includes the blade flexures that attach to a mirror.

The transition plate 46 is the final plate in the six degrees-of-freedom positioner. This plate is called the transition plate because it is the transition between the actual positioner mechanisms and the object to be positioned. This plate is permanently attached to the mirror 4 by three tangential blade flexures 34. Due to the design of the system, this plate and anything attached to it, would be placed in a coating chamber along with the mirror when coating is required. Therefore, it is necessary to ensure that the transition plate 46 and any components attached to it are vacuum compatible. FIG. 28 shows the position of the transition plate 46 relative to the rest of the positioner as well as the components associated with the transition plate 46.

The transition plate 46 is manufactured from the same material as the base plate 36.

Figure 29:
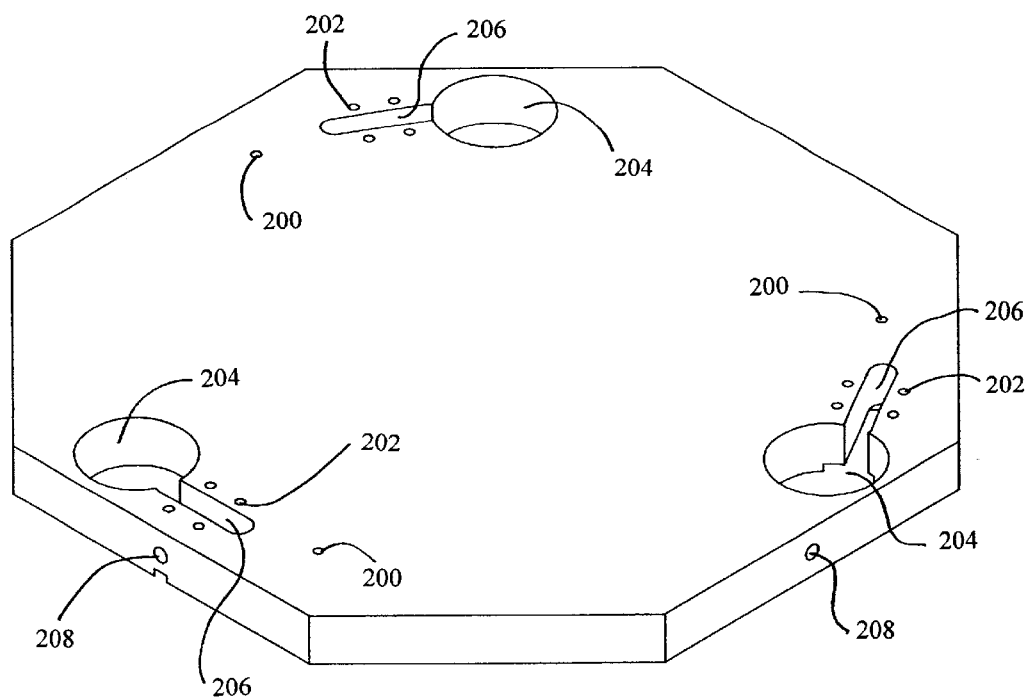
FIG. 29 is an isometric top view of the transition plate of FIG. 28.
Figure 30:
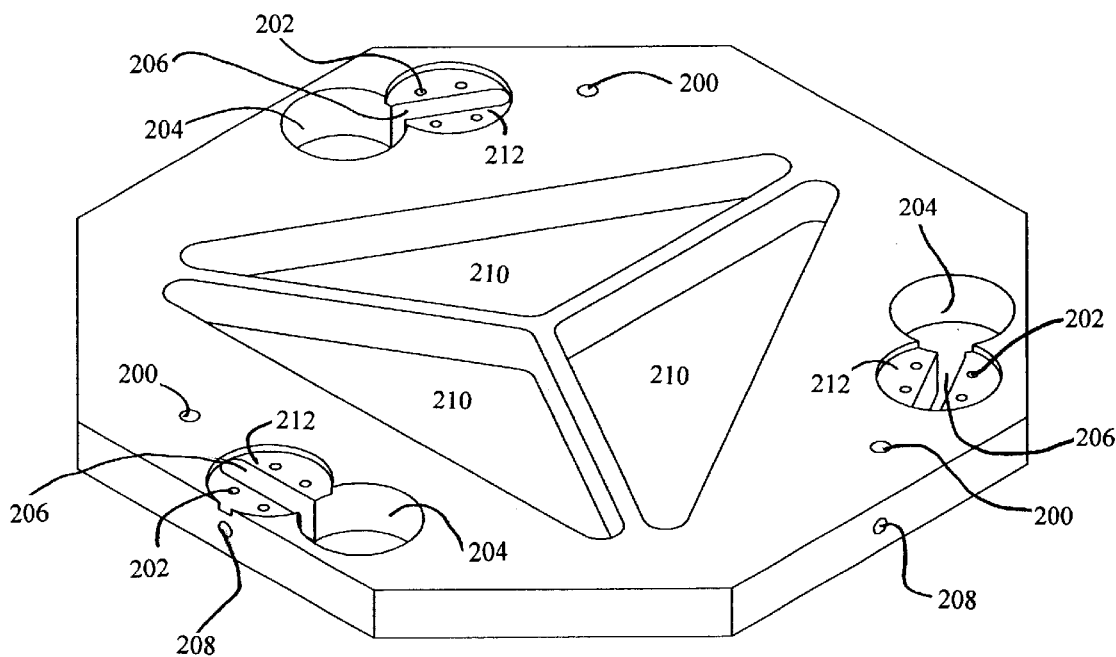
FIG. 30 is an isometric bottom view of the transition plate of FIG. 28.

The transition plate 46 has five main features that provide the required functionality. The transition plate 46 and its features are shown in FIG. 29 and FIG. 30. These features are:

Vented Tooling Ball Holes 200

Vented Flexure Bolt Holes 202

Flexure Insertion Hole 204

Flexure Attachment and Clearance Slot 206

Mirror Capture Ring Bracket Holes 208

Mass Reduction Pockets 210 (first embodiment only)

There are three vented tooling ball holes 200 located in the transition plate 46. The shanks of the tooling balls 178 are pressed into these holes thus necessitating a tight interference fit. There are also smaller holes drilled through the top of the plate into the tooling ball holes 200. This vent hole prevents air from being trapped and forming a virtual leak when the assembly is in a vacuum.

The flexures 34 are bolted to the bottom side of the transition plate 46 through bolt holes 202 to reduce the overall height of the system. Three flexure-insertion holes 204 are located in such a manner that the flexures 34 can easily be inserted and moved to their final positions.

There are three slots 206 located in the transition plate 46 that allow the flexures 34 to bend during operation of the positioner. These slots 206 are centred at the optimal support radius of the mirror being mounted to the six degrees-of-freedom positioner. There is also a recess 212 and threaded bolt holes 202 on the underside of the transition plate 46 that allow for attachment of the flexure 34.

On each side of the transition plate 46 there is a threaded hole 208. These holes allow the mirror capture ring brackets 216 to be attached to the transition plate 46.

There are three mass reduction pockets 210 in the back of the transition plate 46. These pockets reduce the mass of the plate by 30% without significantly increasing the flexure of the plate. These pockets do not pass all the way through the plate.

Associated Parts

There are two components associated with the operation of the transition plate 46. These parts are:

Tooling Balls 178

Flexures 34

There are three tooling balls 178 that are pressed into the transition plate 46. These tooling balls 178 pass through the lock plate 44 and establish a kinematic clamp to stage two 40. The tooling balls 178 are made from a hardened stainless steel with a solid welded shank.

The flexures 34 that attach the mirrors 4 to the transition plate 46 are manufactured from a material to closely match the coefficient of thermal expansion of the mirror (in this case Invar 36).

Mirror Safety Capture

The mirror safety capture 48 is composed of two sections. The first section ensures that the six degrees-of-freedom positioner does become separated from the support structure 18. The second section ensures that the mirror 4 does not become separated from the six degrees-of-freedom positioner. Separation could occur because of flexure failure or a failure of the adhesive between the flexures 34 and mirror 4. The main part of the mirror safety capture 48 is a ring 214 that prevents the mirror from moving by more than one millimetre (see FIG. 31).

The mirror capture ring 214 is manufactured from an engineering thermoplastic such as Delrin™. Delrin™ is used to reduce possible damage to the mirrors in the event of a component failure as a metal ring may cause the mirror edges to chip.

Figure 31:
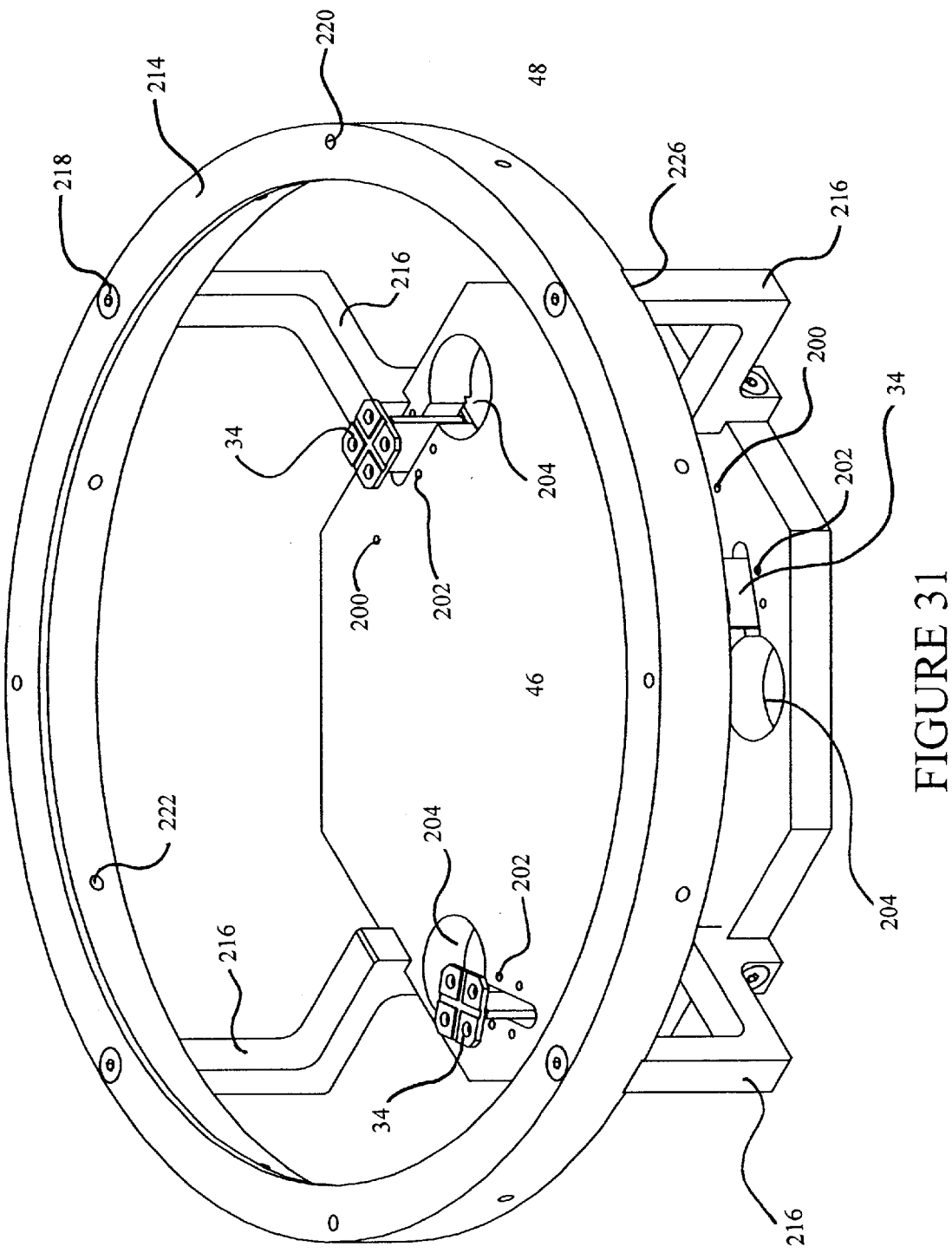
FIG. 31 is an isometric view of the mirror safety capture of the positioner of FIG. 3, also showing the blade flexures that attach to a mirror.

There are three features on the mirror capture ring 214 that give the part its functionality. FIG. 31 shows these features.

"Inverted L" Cross Section

Mirror Capture Ring Bracket Bolt Holes 218

Mirror Safety Cover Bolt Holes 220

Temporary Mirror Holding Holes 222

The mirror capture ring 214 has an "Inverted L" cross section. This cross section allows the ring to capture the mirror securely.

There are four mirror capture ring bracket bolt holes 218 spaced around the mirror capture ring 214. These holes allow mirror capture ring brackets 216 to be attached to the mirror capture ring 214.

There are four threaded holes 220, for a mirror safety cover (not shown), spaced around the mirror capture ring 214. These holes allow a mirror safety cover to be attached to the mirror capture ring 214.

Around the circumference of the mirror capture ring 214 are eight threaded holes 222. Nylon™ screws are used in these holes to grip the mirrors 4 and position them accurately on the flexures 34 during initial alignment before they are bonded to the flexures 34.

Associated Parts

There is one component associated with the mirror capture ring 214. This part is:

Mirror Capture Ring Bracket 216

The mirror capture ring brackets 216 are different for each positioner. In each case, these components are manufactured from Delrin™. The brackets hold the mirror capture ring 214 in the correct position relative to the appropriate mirror. On the top of each bracket is a small feature (not shown) that engages with a complementary slot 226 on the bottom side of the capture ring (FIG. 31). These features ensure that the capture ring 214 can be repeatably placed on the brackets 216.

Many modifications and variations are possible and would be apparent to a person skilled in the art in light of the above teachings. It is therefore to be understood that the invention can be practiced otherwise than as specifically described herein and still will be within the spirit and scope of the appended claims.

What is claimed is:

1. A positioner for transmitting movement in up to six degrees-of-freedom to an object on the positioner, the positioner comprising:
   a base plate, a first plate and a second plate, said plates being in a stacked relationship with each other;
   the first plate being mounted on the base plate by a first mechanical linkage, and
   the second plate being mounted on the first plate by a second mechanical linkage;
   a first actuator arrangement for moving the first plate in up to three degrees-of-freedom;
   a second actuator arrangement for moving the second plate in up to three degrees-of-freedom; and
   a holder attached to the second plate for mounting the object;
   wherein one of the first and second plates is movable only in a plane, and the other of the first and second plates is movable only out of said plane;
   whereby the second plate is movable in up to six degrees of freedom.

2. A positioner according to claim 1, wherein the first plate is movable in a plane in up to three degrees-of-freedom, and the second plate is movable in up to three degrees-of-freedom that are out of the plane in which the first plate can be moved.

3. A positioner according to claim 2, wherein the first actuator arrangement for moving the first plate comprises a first plurality of actuators mounted on the base plate.

4. A positioner according to claim 3, wherein the first plurality of actuators comprises a first, a second and a third actuator.

5. A positioner according to claim 4, wherein the first actuator contacts a first edge of the first plate and the second and third actuators contact a second edge of the first plate.

6. A positioner according to claim 5, wherein the first and second edges of the first plate are substantially orthogonal.

7. A positioner according to claim 4, wherein the first, second and third actuators each comprise a micrometer.

8. A positioner according to claim 2, wherein the second actuator arrangement comprises a second plurality of actuators mounted on the first plate.

9. A positioner according to claim 8, wherein the second plurality of actuators comprises a fourth, a fifth and a sixth actuator.

10. A positioner according to claim 9, wherein the fourth, fifth and sixth actuators are spaced apart and extend substantially orthogonally from the first plate and contact a surface of the second plate.

11. A positioner according to claim 10, wherein the second bias comprises a third set of springs anchored to the second plate and to the first plate.

12. A positioner according to claim 9, wherein the fourth, fifth and sixth actuators each comprise a micrometer assembly that includes a contact pin for contacting the second plate.

13. A positioner according to claim 12, wherein the second mechanical linkage is lockable and comprises three rods, each housed in its own passage in the first plate perpendicular to, and intersecting with, the contact pins of the fourth, fifth and sixth actuators respectively, wherein each rod has a indented portion that partially surrounds a respective contact pin, and wherein each rod has a threaded portion having a nut for tightening to produce frictional engagement of the rod with its respective contact pin.

14. A positioner according to claim 1, wherein an additional plate, including an actuator arrangement for moving the additional plate, is mounted by a mechanical linkage between the second plate and the holder.

15. A positioner according to claim 1, further comprising a first bias for biasing the first plate against the first actuator arrangement.

16. A positioner according to claim 15, wherein the first bias comprises a set of springs anchored to the base plate and the first plate.

17. A positioner according to claim 16, wherein the first bias comprises:
   a first set of springs anchored to the base plate and to the first plate, for biasing the first edge of the first plate against the first actuator; and
   a second set of springs anchored to the base plate and to the first plate, for biasing the second edge of the first plate against the second and third actuators.

18. A positioner according to claim 1, further comprising a second bias for biasing the second plate against the second actuator arrangement.

19. A positioner according to claim 1, wherein the first mechanical linkage is lockable.

20. A positioner according to claim 19, wherein the first lockable mechanical linkage comprises a plurality of bolts and a corresponding plurality of nuts;
   wherein the bolts are spaced apart and extend through corresponding clearance holes in the base plate and holes in the first plate.

21. A positioner according to claim 1, wherein the second mechanical linkage is lockable.

22. A positioner according to claim 1, wherein the holder comprises:
   a third plate substantially parallel to the second plate and connected thereto by a third mechanical linkage; and
   a fourth mechanical linkage for connecting the object to the third plate.

23. A positioner according to claim 22, wherein the third mechanical linkage comprises a plurality of tooling balls, each tooling ball being on a corresponding arm that extends from the third plate, the arms being spaced apart and the balls being sized to pass through corresponding holes in a lock plate into corresponding sockets in the second plate, wherein each hole in the lock plate includes an elongated slot sized to receive a corresponding arm when the lock plate is rotated to a locking position, in which the tooling balls are each in a corresponding lock groove in the lock plate, after the tooling balls have been passed through the corresponding holes in the lock plate.

24. A positioner according to claim 23, wherein the third mechanical linkage comprises three tooling balls.

25. A positioner according to claim 22, wherein the fourth mechanical linkage comprises a plurality of flexures secured to the object in a spaced apart configuration, each flexure including an arm extending from the object and terminating in a locking portion that is substantially orthogonal to the arm, wherein the locking portion is sized to pass through a corresponding hole in the third plate, each corresponding hole in the third plate including a slot sized to receive an arm when the object is rotated to a locking position, after the locking portions have been passed through the corresponding holes in the third plate, and wherein the flexures are secured to the third plate by bolts.

26. A positioner according to claim 25, wherein the fourth mechanical linkage comprises three flexures.

27. A positioner according to claim 1, wherein the positioner further comprises a mirror mounted on the holder.

28. A positioner according to claim 27, wherein the mirror is an off-axis conic mirror.

29. A positioner according to claim 1, wherein positioning of the holder is determined by a computer-based algorithm.

30. A positioner according to claim 1, wherein the actuator arrangements are motorized and their movement is controlled by a computer.

* * * * *